United States Patent
Ishida et al.

(10) Patent No.: US 10,027,835 B2
(45) Date of Patent: Jul. 17, 2018

(54) IMAGE READING APPARATUS AND IMAGE FORMING APPARATUS

(71) Applicant: KONICA MINOLTA, INC., Chiyoda-ku, Tokyo (JP)

(72) Inventors: Takeshi Ishida, Toyohashi (JP); Tatsuya Eguchi, Toyohashi (JP); Isao Watanabe, Toyohashi (JP); Hiroaki Takatsu, Nishio (JP); Taku Kimura, Toyokawa (JP); Atomu Nakashima, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/622,164

(22) Filed: Jun. 14, 2017

(65) Prior Publication Data

US 2017/0374217 A1    Dec. 28, 2017

(30) Foreign Application Priority Data

Jun. 22, 2016    (JP) .................................. 2016-123355

(51) Int. Cl.
*H04N 1/04*    (2006.01)
*H04N 1/00*    (2006.01)
(Continued)

(52) U.S. Cl.
CPC ..... *H04N 1/00885* (2013.01); *H04N 1/00018* (2013.01); *H04N 1/00095* (2013.01);
(Continued)

(58) Field of Classification Search
CPC ........... H04N 1/00885; H04N 1/00018; H04N 1/00095; H04N 1/00901; H04N 1/00904;
(Continued)

(56) References Cited

U.S. PATENT DOCUMENTS 5,913,091 A * 6/1999 Nanba .................... G03G 15/04
399/32
7,310,245 B2 * 12/2007 Ohbo .................. H02M 3/3376
363/17

(Continued)

FOREIGN PATENT DOCUMENTS

JP    2010228447 A * 10/2010
JP    2011110920 A * 6/2011
JP    2011176949 A    9/2011

*Primary Examiner* — Cheukfan Lee
(74) *Attorney, Agent, or Firm* — Holtz, Holtz & Volek PC

(57) ABSTRACT

An image reading apparatus includes: a movable body configured to illuminate a document with light; and an apparatus body configured to wirelessly transmit power to the movable body, wherein the movable body includes receiver coils, and a feed circuit in which the receiver coils uses receiving power to supply power to a load, the apparatus body includes transmitter coils placed along a track of the receiver coils, the transmitter coils and the receiver coils are placed such that power supply efficiency of any receiver coil with the transmitter coil placed along the track of the receiver coil fluctuates, and power supply efficiency related to one receiver coil increases at a position where power supply efficiency related to the other receiver coil drops, and the feed circuit supplies power sequentially using the receiving power of the receiver coil whose power supply efficiency is increased to highest among the receiver coils.

12 Claims, 24 Drawing Sheets

(51) Int. Cl.
*H04N 1/028* (2006.01)
*H04N 1/10* (2006.01)

(52) U.S. Cl.
CPC ..... *H04N 1/00901* (2013.01); *H04N 1/00904* (2013.01); *H04N 1/00907* (2013.01); *H04N 1/02815* (2013.01); *H04N 1/04* (2013.01); *H04N 1/103* (2013.01); *H04N 1/1026* (2013.01)

(58) Field of Classification Search
CPC .. H04N 1/00907; H04N 1/02815; H04N 1/04; H04N 1/1026; H04N 1/103
USPC ....... 358/497, 494, 409, 412, 482, 483, 471, 358/474; 250/239
See application file for complete search history.

(56) References Cited

U.S. PATENT DOCUMENTS

| | | | | |
|---|---|---|---|---|
| 8,912,730 | B2* | 12/2014 | Nakajo | H05B 37/02 |
| | | | | 315/218 |
| 9,627,129 | B2* | 4/2017 | Abe | H01F 38/14 |
| 2013/0057078 | A1* | 3/2013 | Lee | H02J 7/00 |
| | | | | 307/104 |
| 2015/0380950 | A1* | 12/2015 | Ogasawara | H01F 38/14 |
| | | | | 307/104 |

* cited by examiner

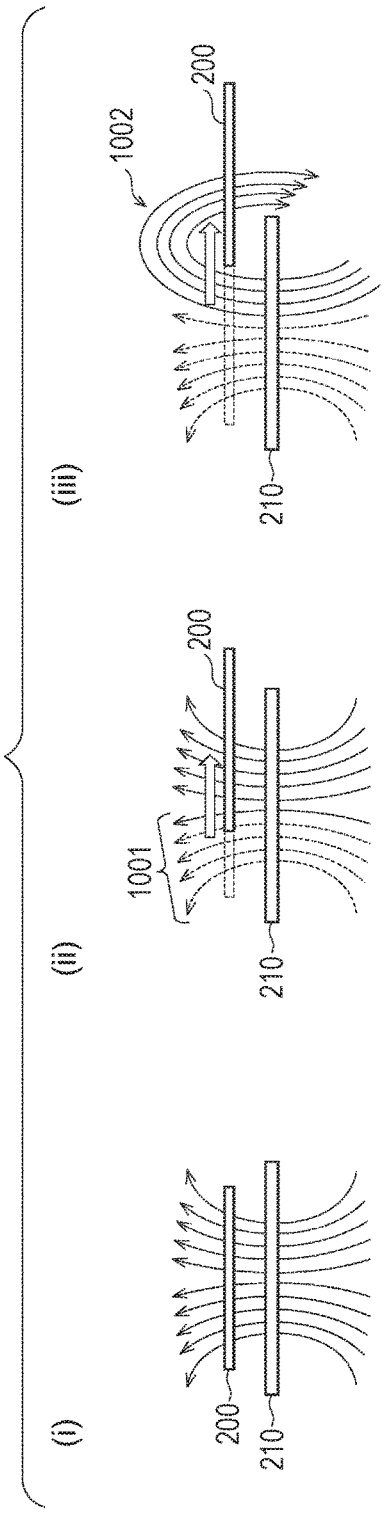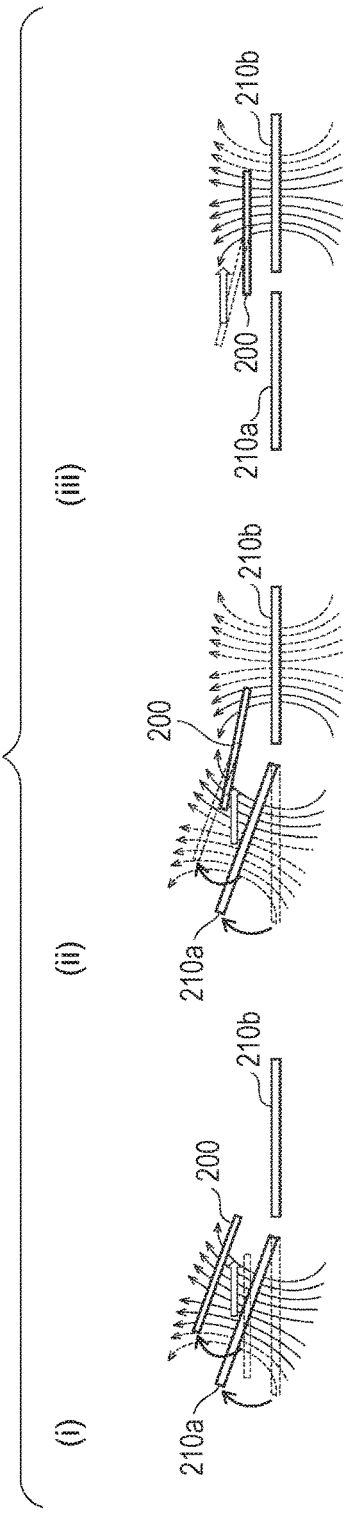

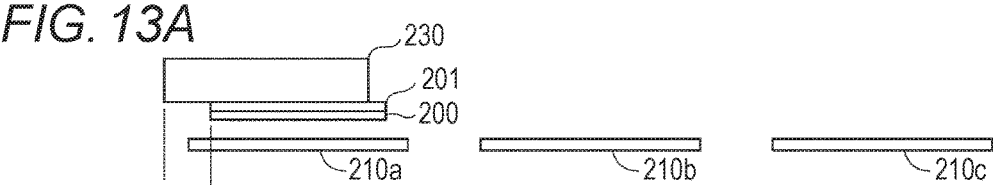
FIG. 13A
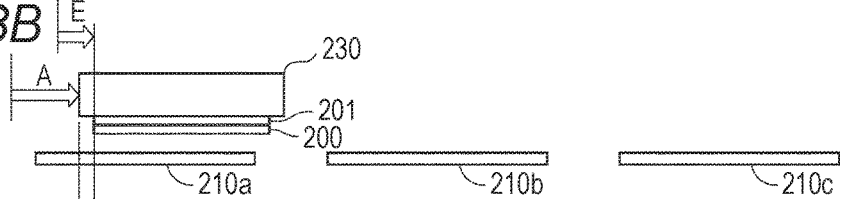
FIG. 13B
FIG. 13C
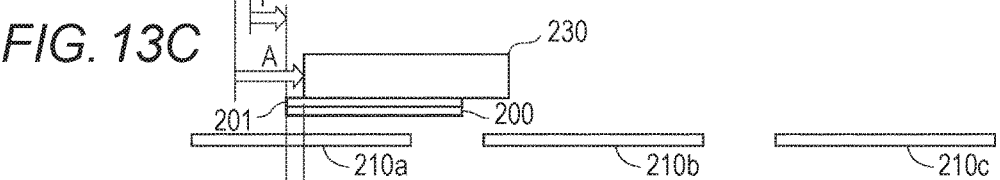
FIG. 13D
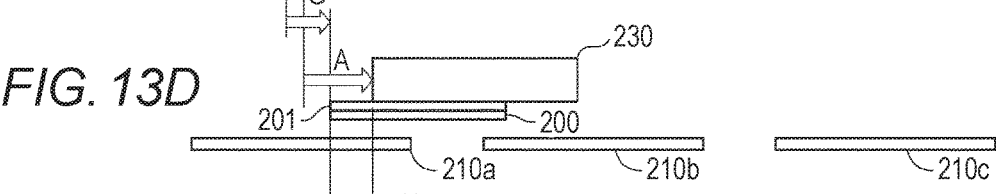
FIG. 13E
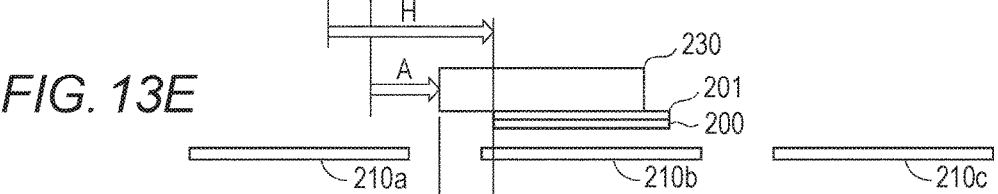
FIG. 13F
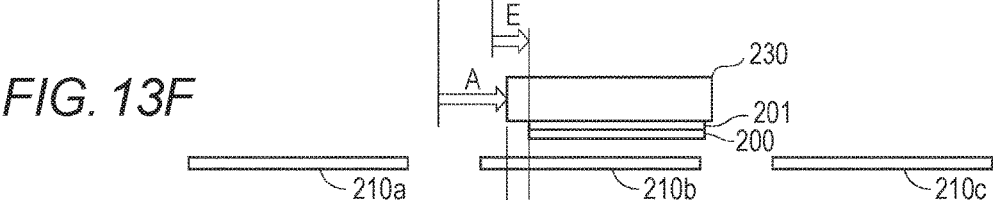
FIG. 13G
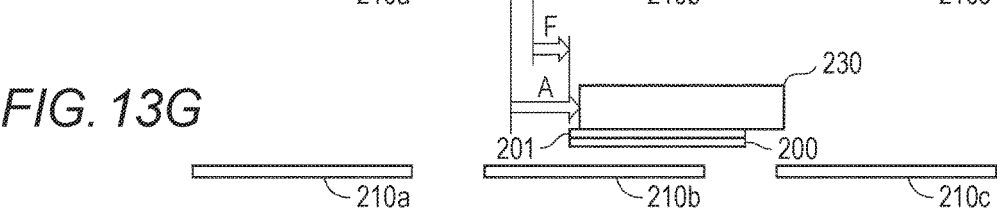

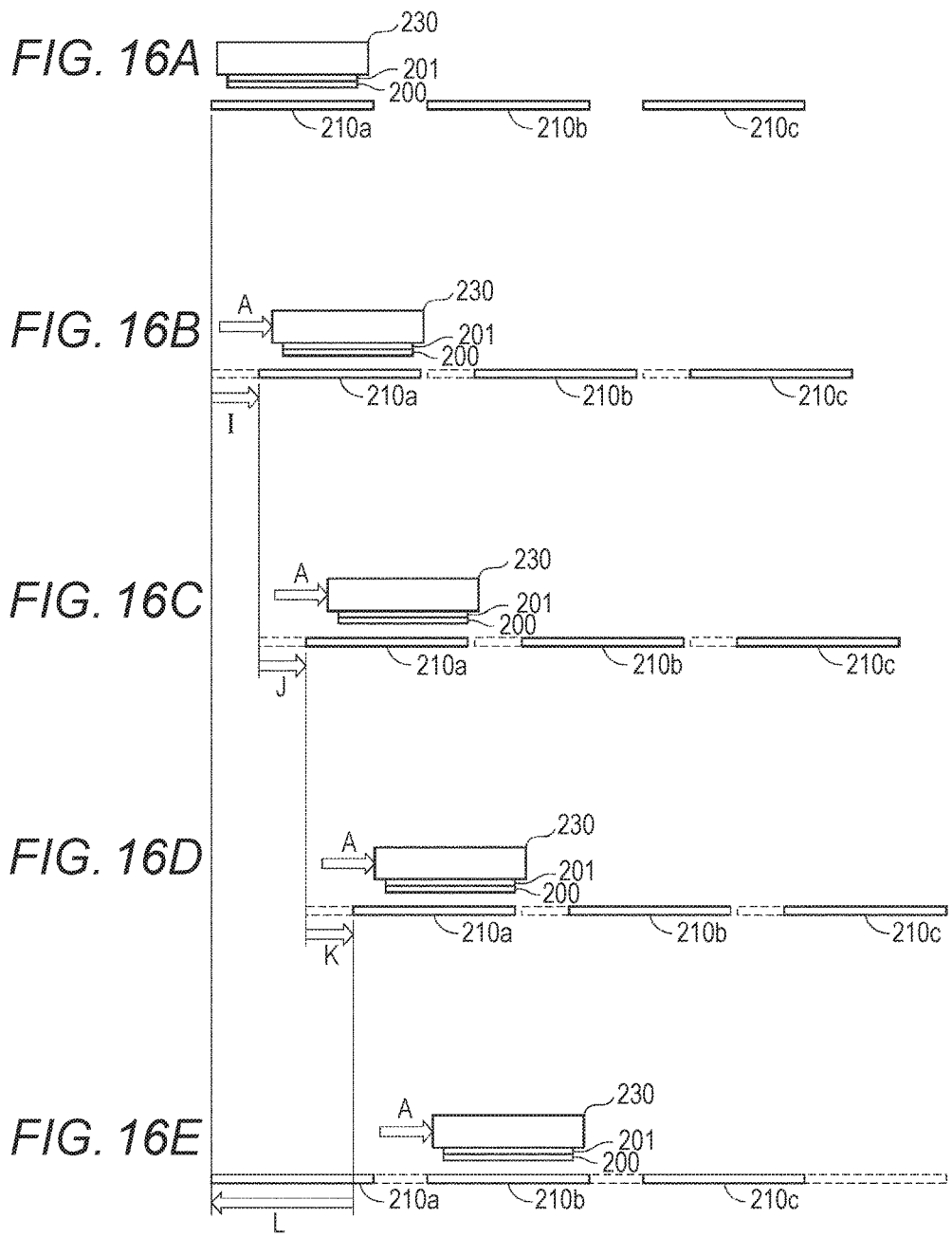

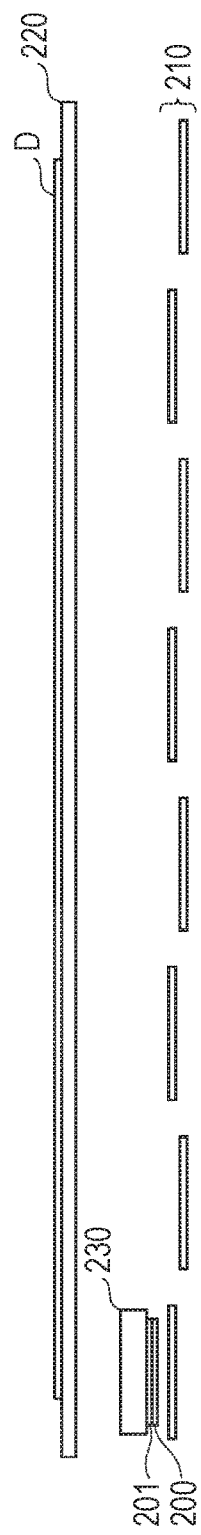
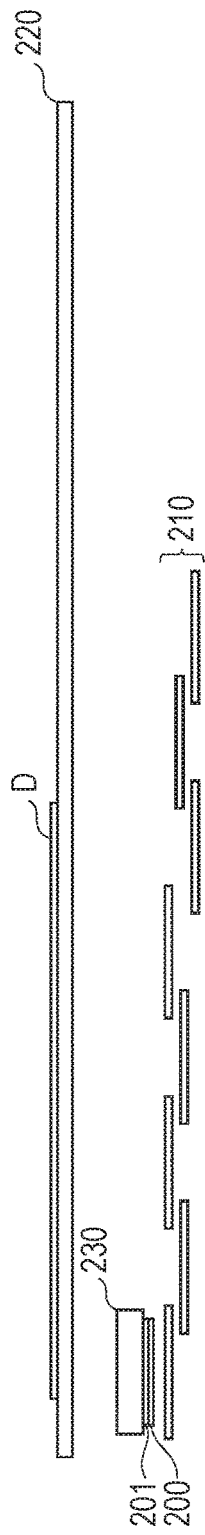

TRAVEL STEP

POWER FEED TABLE

POWER FEED TABLE

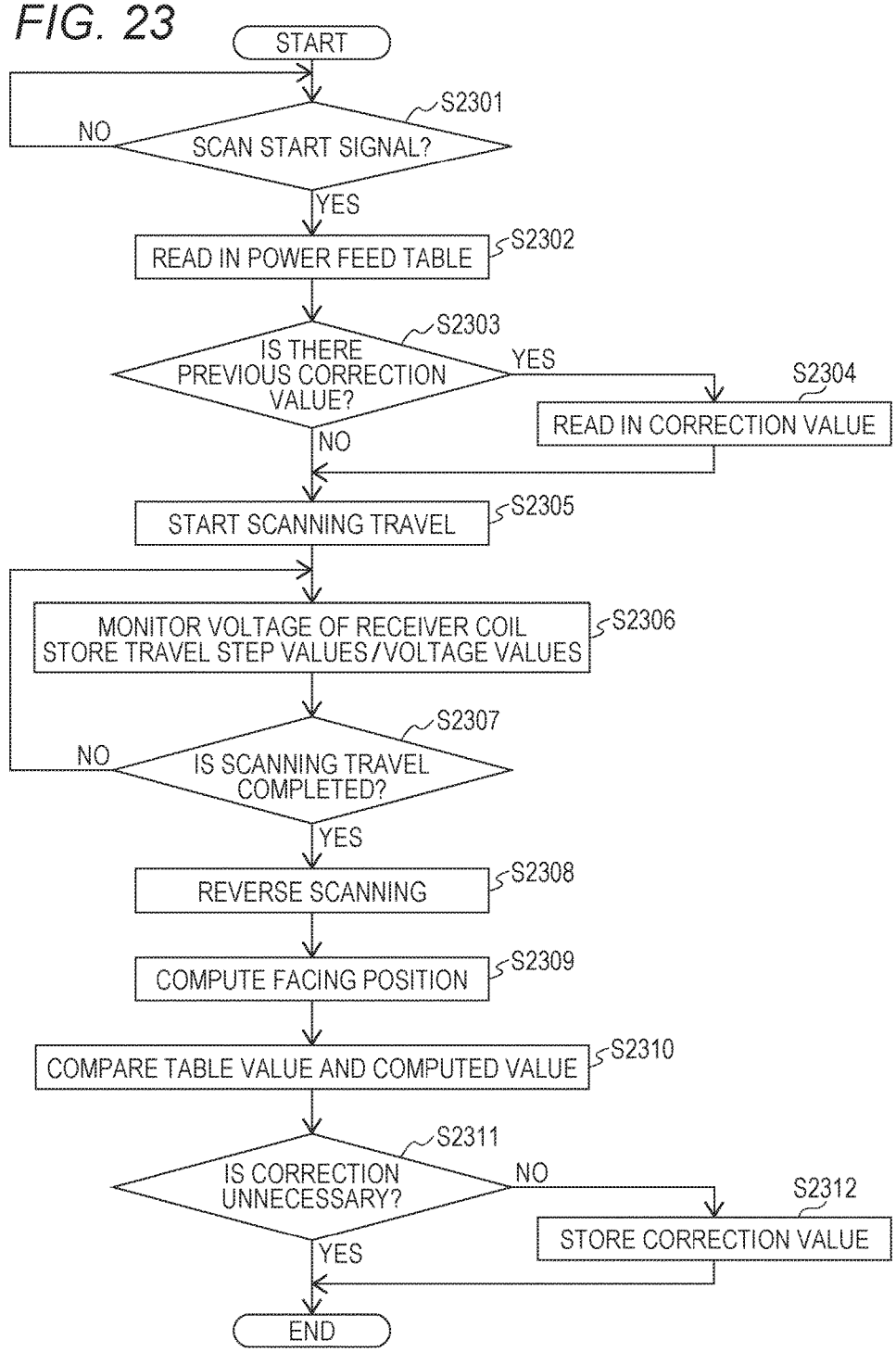

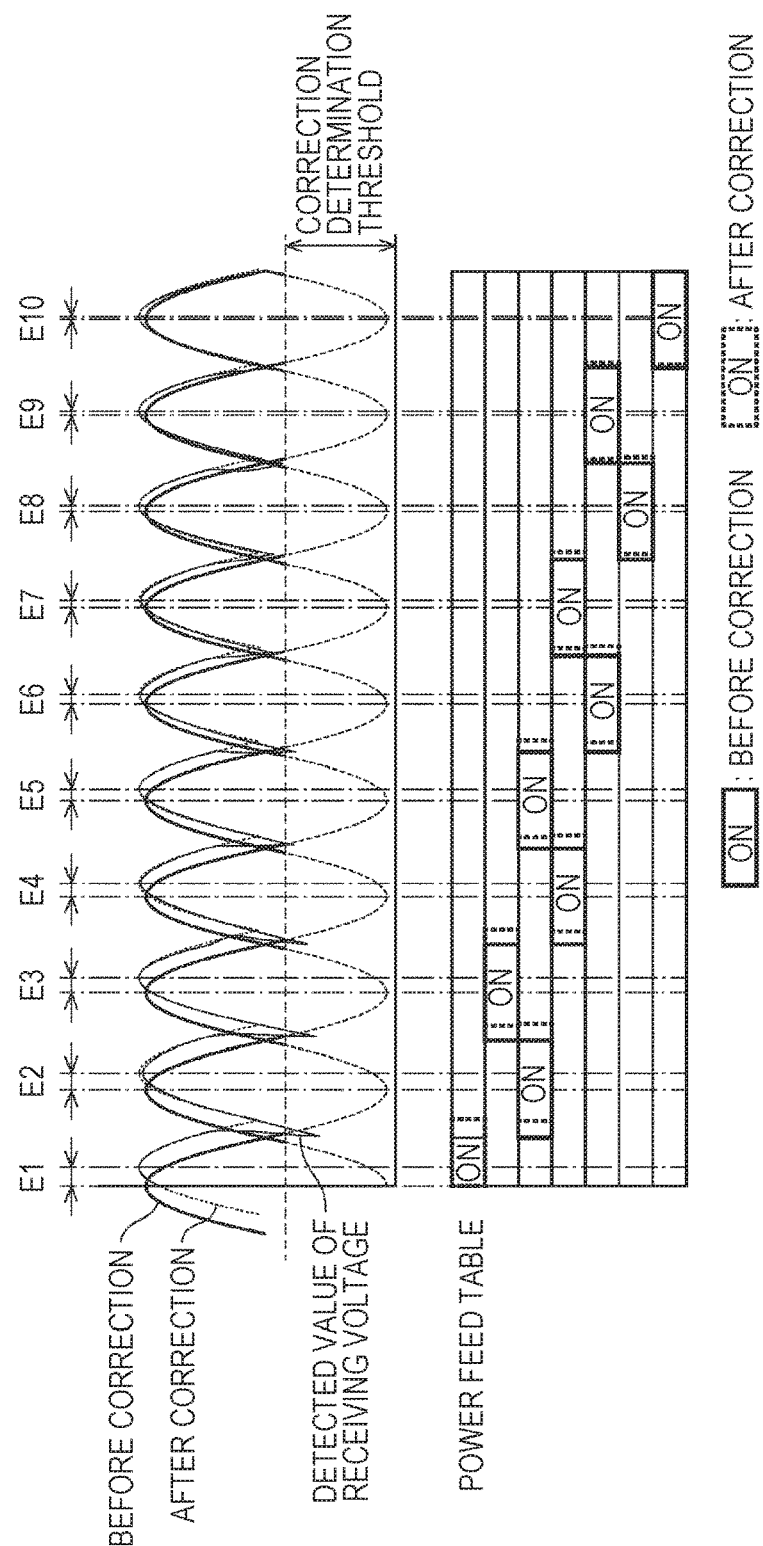

IMAGE READING APPARATUS AND IMAGE FORMING APPARATUS

The entire disclosure of Japanese Patent Application No. 2016-123355 filed on Jun. 22, 2016 including description, claims, drawings, and abstract are incorporated herein by reference in its entirety.

BACKGROUND OF THE INVENTION

Field of the Invention

The present invention relates to an image reading apparatus and an image forming apparatus, and particularly relates to a technology for stabilizing wireless power transfer to a carriage.

Description of the Related Art

In recent years, flatbed scanners are widespread as image sensors that read image information from a document. The flatbed scanner is for reading a document placed on a document glass, using a carriage that travels in a sub-scanning direction along the document glass. The flatbed scanners include a reduction optical system type and a 1:1 optical system type.

The carriage needs to travel whenever reading a document. Accordingly, power supply wiring that supplies power to the carriage also repeats bending and extending following the reading of a document. Hence, the power supply wiring of the carriage has the risk of breakage resulting from the accumulation of mechanical stress.

To solve such a problem, the use, for the power supply wiring of the carriage, of a flex cable that is resistant to repeated bending, or an FFC (Flexible Flat Cable) including conductors on a flexible member can reduce the risk of breaking the power supply wire to the carriage and can reduce mechanical resistance that the carriage receives when traveling.

However, when an attempt is made to extend the life of the flatbed scanner and increase a document reading speed, the power supply wiring requires still higher durability. Moreover, when the travel of the carriage s increased in speed, the influence of the bending load of the power supply wiring on the travel speed is increased; accordingly, it becomes impossible to disregard a reduction in image quality.

Hence, a proposal to supply power to the carriage by wireless power transfer has been made. With wireless power transfer, it is possible to eliminate the breakage of the power supply wiring due to bending fatigue and fluctuations in the speed of the carriage due to the bending load; accordingly, high durability and image quality can be achieved.

Patent Literature 1: JP 2011-110920 A
Patent Literature 2: JP 2011-176949 A

When wireless power transfer is performed only at a specific position such as a home position of the carriage, a secondary battery is mounted in the carriage to supply power during travel. There arise drawbacks such as that the travel speed of the carriage is limited by the weight of the secondary battery, and the start of reading an image is delayed and a repeated operation cannot be performed at high speed to secure a cycle time necessary for charging. Moreover, the use of the secondary battery leads to cost increase. Accordingly, it is not desired to mount the secondary battery in the carriage.

On the other hand, if transmitter coils are lined up along a sub-scanning direction so as to face a travel path of a receiver coil, wireless power transfer can be performed regardless of the position of the carriage.

However, multiple transmitter coils need to be lined up along the sub-scanning direction to supply power without interruption during the travel of the carriage. Accordingly, cost increase cannot be avoided. Moreover, if the number of transmitter coils is reduced to reduce the cost, a coupling coefficient is reduced depending on the positional relationship between the transmitter coil and the receiver coil and then the receiving voltage drops. The intensity of light of a light source to illuminate a document may subsequently decrease to reduce scanned image quality. However, if the voltage to be applied by the transmitter coil is increased, it is against the power saving request.

SUMMARY OF THE INVENTION

The present invention has been made considering the above-mentioned problems, and an object thereof is to provide an image reading apparatus and an image forming apparatus that can stabilize wireless power transfer to a carriage while suppressing cost increase.

To achieve the abovementioned object, according to an aspect, an image reading apparatus reflecting one aspect of the present invention comprises: a movable body configured to illuminate a document with light while traveling; and an apparatus body configured to wirelessly transmit power to the movable body, wherein the movable body includes a plurality of receiver coils, and a feed circuit in which the plurality of receiver coils uses receiving power to supply power to a load in the movable body, the apparatus body includes a plurality of transmitter coils placed along a track of the receiver coils following the travel of the movable body, the transmitter coils and the receiver coils are placed such that power supply efficiency of any receiver coil with the transmitter coil placed along the track of the receiver coil fluctuates as the movable body travels, and power supply efficiency related to one receiver coil increases at a position where power supply efficiency related to the other receiver coil drops during the travel of the movable body, and the feed circuit supplies power sequentially using the receiving power of the receiver coil whose power supply efficiency is increased to highest among the plurality of receiver coils during the travel of the movable body.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2A is a plan view and FIG. 2B is a cross-sectional perspective view;

FIG. 4A shows the embodiment, and FIG. 4B shows a case where the carriage includes only one receiver coil;

FIG. 6A is a plan view, and FIG. 6B is a cross-sectional perspective view;

FIG. 7A is a plan view, and FIG. 7B is a cross-sectional perspective view when viewed from the front;

FIGS. 10A and 10B are diagrams explaining a relationship between a positional relationship between the receiver coil and the transmitter coil, and a coupling coefficient;

FIGS. 13A to 13G are diagrams showing a positional relationship between the receiver coil that reciprocates with respect to the carriage and the transmitter coil, where the positional relationship changes from A to G as the carriage travels;

FIGS. 16A to 16E are diagrams showing a positional relationship between the transmitter coil that reciprocates with respect to the apparatus body of the scanner and the receiver coil, where the positional relationship changes from A to E as the carriage travels;

FIG. 17A shows a case of reading a large size document, and FIG. 17B shows a case of reading a small size document;

FIG. 18A shows intervals between the transmitter coils of when reading the large size document;

FIG. 18B shows intervals between the transmitter coils of when reading the small size document;

FIG. 23 is a flowchart showing a process to be executed by a control unit to correct timings to start and stop applying a feeding voltage; and FIGS. 24A and 24B are diagrams proposing receiving voltages before and after correction and power feed tables before and after the correction.

DESCRIPTION OF THE PREFERRED EMBODIMENTS

Figure 1:
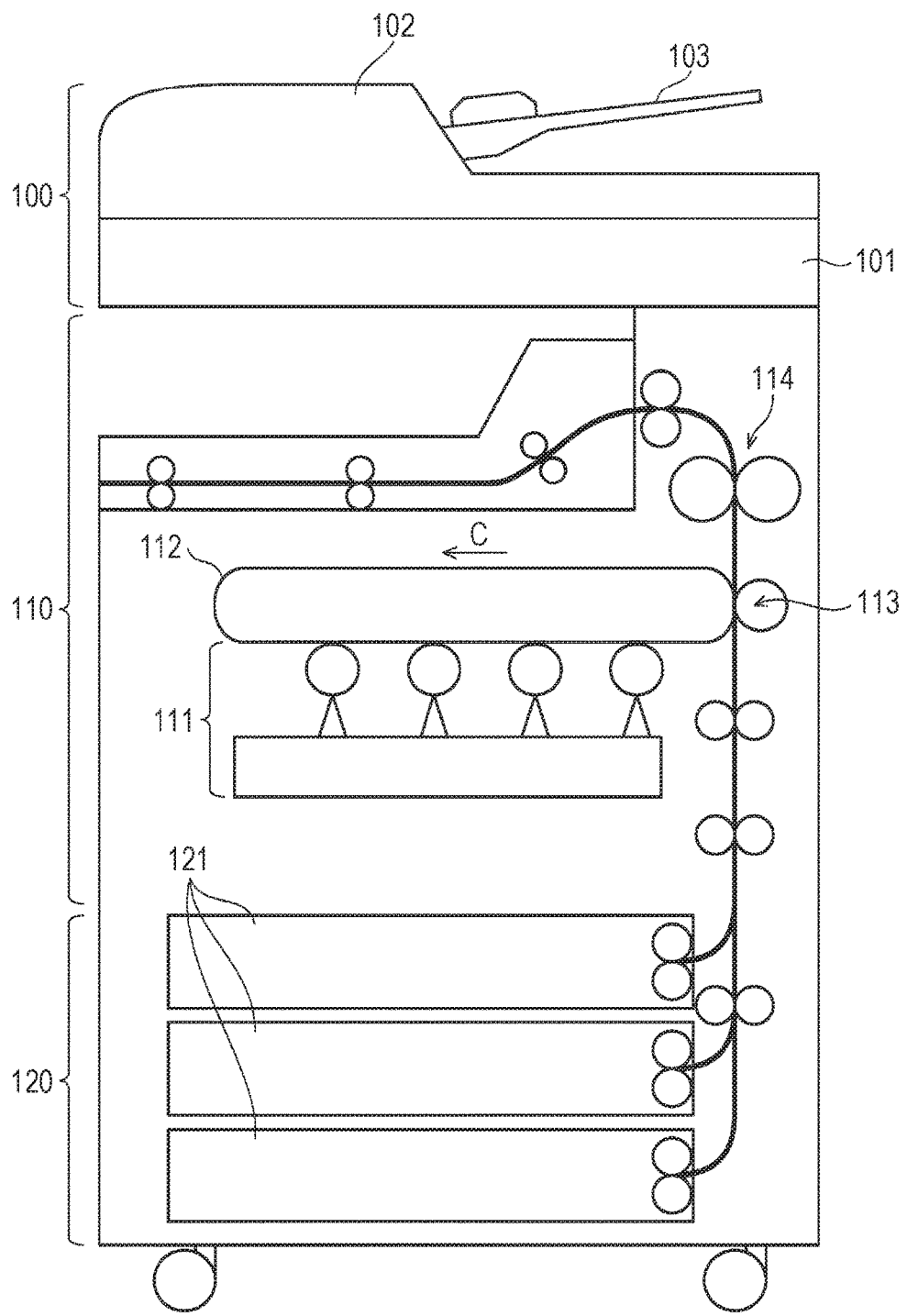
FIG. 1 is a diagram showing the main configuration of an image forming apparatus according to a first embodiment.

Hereinafter, embodiments of an image reading apparatus and an image forming apparatus according to the present invention will be described with reference to the drawings. However, the scope of the invention is not limited to the illustrated examples.

[1] First Embodiment

Firstly, a first embodiment of the present invention is described.

In terms of an image reading apparatus according to the embodiment, a plurality of transmitter coils is lined up along the travel direction (sub-scanning direction) of a carriage in an apparatus body so as to make intervals between center positions (hereinafter referred to as the "center interval") constant. In addition, a plurality of receiver coils is lined up along the sub-scanning direction in the carriage so as to make the center intervals constant. The center interval between the receiver coils is set to a non-integer multiple of the center interval between the transmitter coils to stabilize the receiving voltage of the carriage.

(1-1) The Configuration of the Image Forming Apparatus

Firstly, the configuration of the image forming apparatus according to the embodiment is described.

In the specification, if there are members common to the embodiments, common reference numerals are assigned to them. Moreover, a direction orthogonal to the sub-scanning direction in plan view is assumed to be a main scanning direction, and a direction orthogonal to both of the main scanning direction and the sub-scanning direction to be a vertical direction. Furthermore, a home side of the carriage in the sub-scanning direction is assumed to be "upstream" and a travel destination side after reading of a document to be "downstream."

As illustrated in FIG. 1, an image forming apparatus 1 according to the embodiment is what is called a tandem color multi-function peripheral (MFP: Multi-Function Peripheral), and includes an image reading unit 100, an image forming unit 110, and a paper feed unit 120. The image reading unit 100 includes a scanner 101 and an automatic document feeder (ADF: Automatic Document Feeder) 102. The automatic document feeder 102 supplies a document placed on a document tray 103 one page at a time to the scanner 101. The scanner 101 reads a document placed on a document glass described below to generate image data, in addition to reading a document supplied from the automatic document feeder 102.

The image forming unit 110, for example, forms an image on the basis of the image data generated by the image reading unit 100. The image forming unit 110 forms a toner image in each of yellow (Y), magenta (N), cyan (C), and black (K) in the image forming unit 111, sequentially superimposes the toner images and electrostatically transfers them (primary transfer) onto an intermediate transfer belt 112, and forms a color toner image. The intermediate transfer belt 112 is an endless belt and runs rotationally in the direction of an arrow C.

The paper feed unit 120 supplies recording sheets from a paper feed tray 121. The supplied recording sheet is transported to a secondary transfer nip 113 to electrostatically transfer the color toner image from the intermediate transfer belt 112 (secondary transfer). The color toner image is thermally fixed on the recording sheet in a fixing unit 114. The recording sheet is then ejected onto an output tray outside the apparatus.

(1-2) The Configuration of the Scanner 101

Next, the configuration of the scanner 101 is described.

Figure 2A:
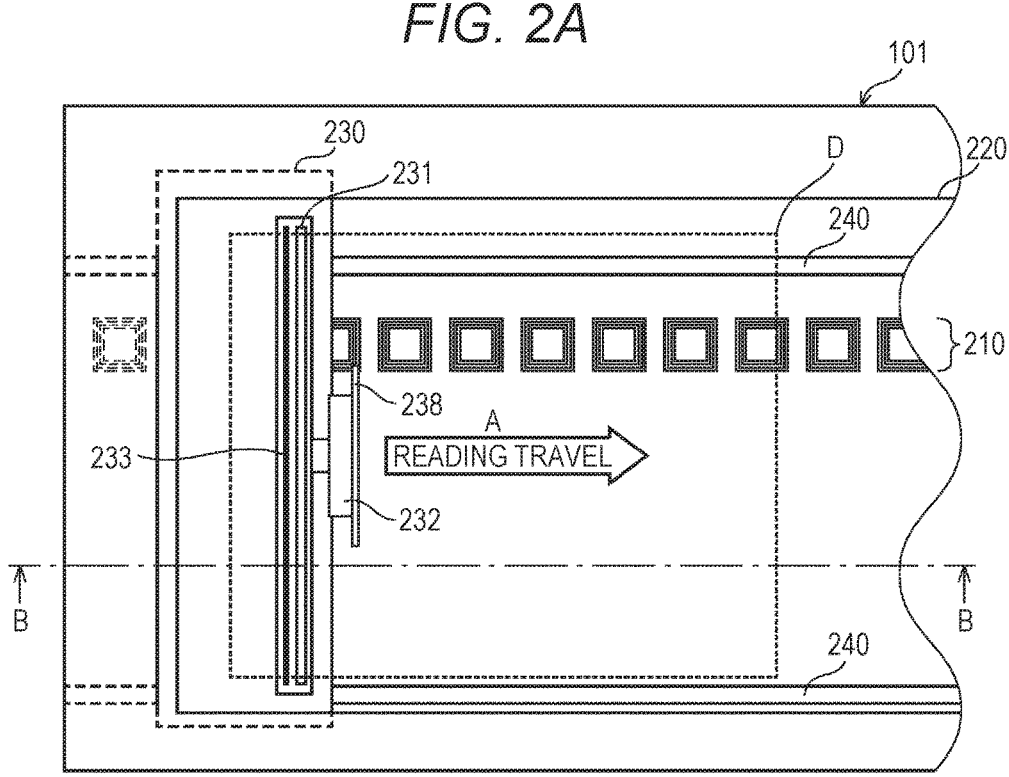
FIGS. 2A and 2B are diagrams showing the main configuration of a scanner.
Figure 2B:
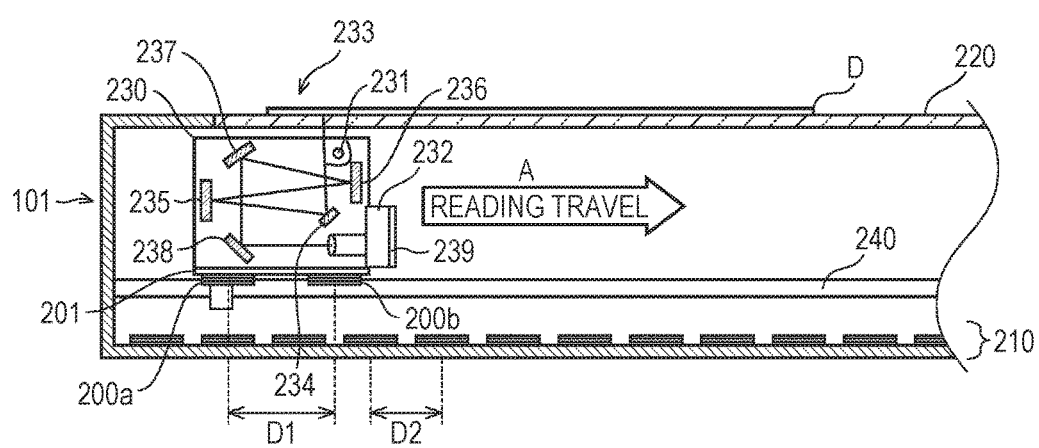

FIG. 2A is a plan view of the scanner 101, and FIG. 2B is a cross-sectional perspective view taken along line B-B in FIG. 2A.

The scanner 101 includes a platen glass 220 on which a document D is placed, a carriage 230 for reading an image from the document D on the platen glass 220, rails 240 for sliding the carriage 230, and transmitter coils 210 for supplying power to the carriage 230. The transmitter coil 210 is what is called a spiral coil having a wire in the shape of a spiral. A part excluding the carriage 230 of the scanner 101 is assumed below to be called the "apparatus body."

A light source 231, mirrors 234, 235, 236, 237, and 238 forming an optical reading system, an imaging device 232, and the like are mounted in the carriage 230. The carriage 230 employs an integral unit scanning system. The imaging device 232 is mounted on a CCD (Charge Coupled Device) board 239.

Upon reading the document D, the light source 231 illuminates a line-of-sight position (reading position) 233 of the document D with light from below through the platen glass 220 while an unillustrated drive mechanism moves the carriage 230 at a constant speed along the rails 240 in the sub-scanning direction (the direction of an arrow A). The optical reading system guides the light reflected from the document D to the imaging device 232 to read an image from the document D.

The image data generated in this manner is sequentially transferred by wireless communication from the CCD board 239 to the apparatus body. For example, IrDA and Bluetooth (registered trademark) can be used for the wireless communication.

Two receiver coils 200a and 200b are attached to the carriage 230 to obtain power for operating the light source 231, the imaging device 232, and the CCD board 239. Power is wirelessly transmitted from a plurality of the transmitter coils 210 attached to the apparatus body to the receiver coils 200a and 200b. The receiver coils 200a and 200b are also spiral coils as in the transmitter coils 210.

The plurality of transmitter coils 210 is lined up so as to make their center intervals constant along the sub-scanning direction over the travel paths of the receiver coils 200a and 200b following the travel of the carriage 230. A center interval D1 between the receiver coils 200a and 200b is 1.5 times a center interval D2 between the transmitter coils 210 (FIG. 2B). In other words, $$D1 = D2 \times 1.5 = D2 \times (2+1)/2$$

In this equation, "2" of "2+1" is the number of the receiver coils 200a and 200b. A feeding voltage (alternating voltage) is applied to the transmitter coils 210 at the start of reading the document D. The application of the feeding voltage is stopped when the reading is completed.

The powers received by the receiver coils 200a and 200b are converted by a power supply circuit board 201 to be supplied to the light source 231 and the imaging device 232.

Figure 3:
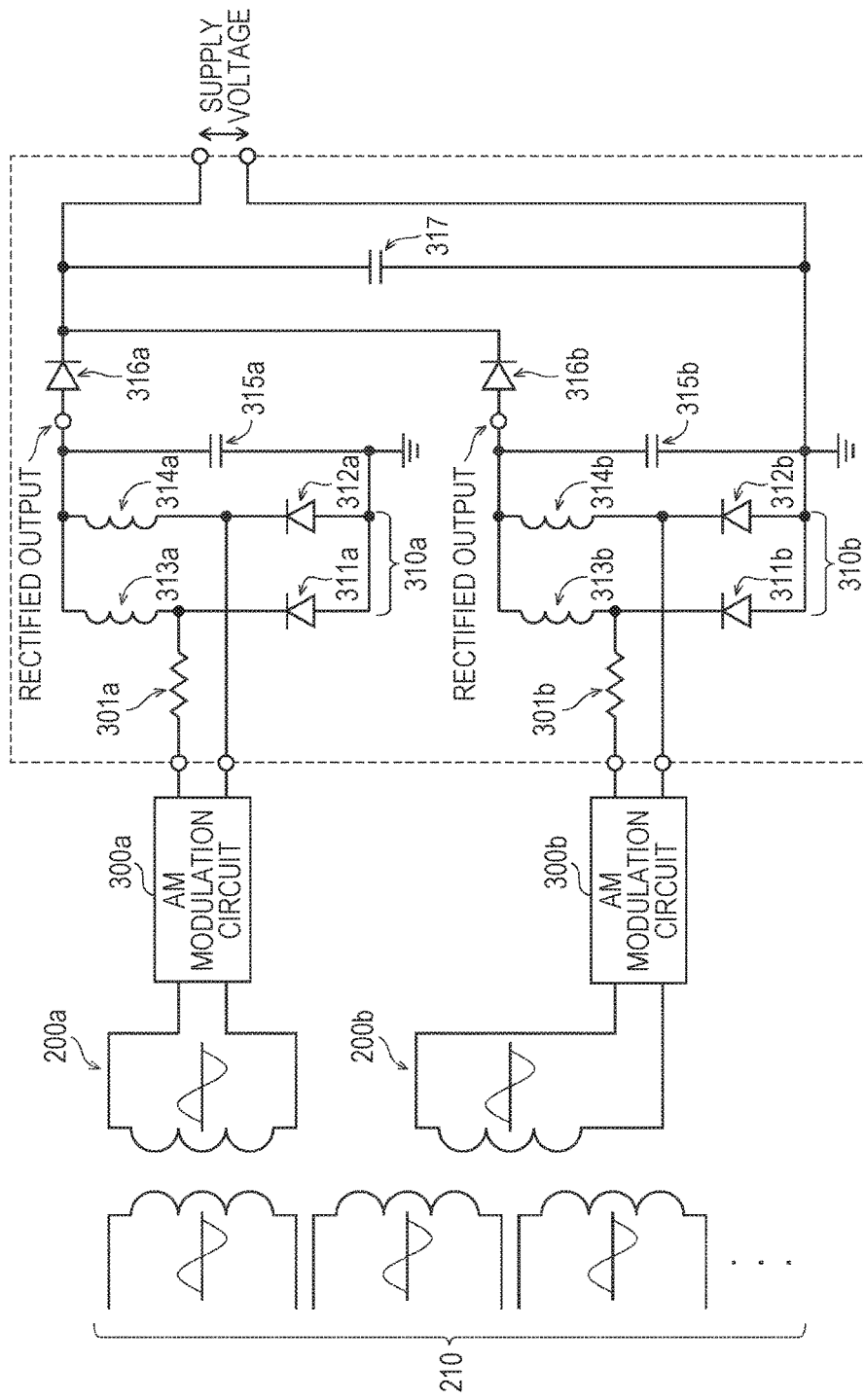
FIG. 3 is a circuit diagram for generating a supply voltage from an output voltage of a receiver coil.

As illustrated in FIG. 3, the amplitudes of the powers received by the receiver coils 200a and 200b are respectively modulated by AM (Amplitude Modulation) modulation circuits 300a and 300b. Their voltages are reduced by electrical resistance elements 301a and 301b to cause current doubler rectifier circuits 310a and 310b to rectify the powers.

The current doubler rectifier circuit 310a is a bridge circuit including diodes 311a and 312a and reactors 313a and 314a. The current doubler rectifier circuit 310b is similarly a bridge circuit including diodes 311b and 312b and reactors 313b and 314b. The outputs of the current doubler rectifier circuits 310a and 310b are respectively smoothed by smoothing capacitors 315a and 315b.

The smoothed powers (rectified outputs) are combined via blocking diodes 316a and 316b. The combined output is further smoothed by a smoothing capacitor 317 to be supplied to the light source 231 and the imaging device 232.

(1-3) Receiving Voltage

Next, the receiving voltage of the carriage 230 is described making a comparison with a case where the carriage includes only one receiver coil.

Figure 4A:
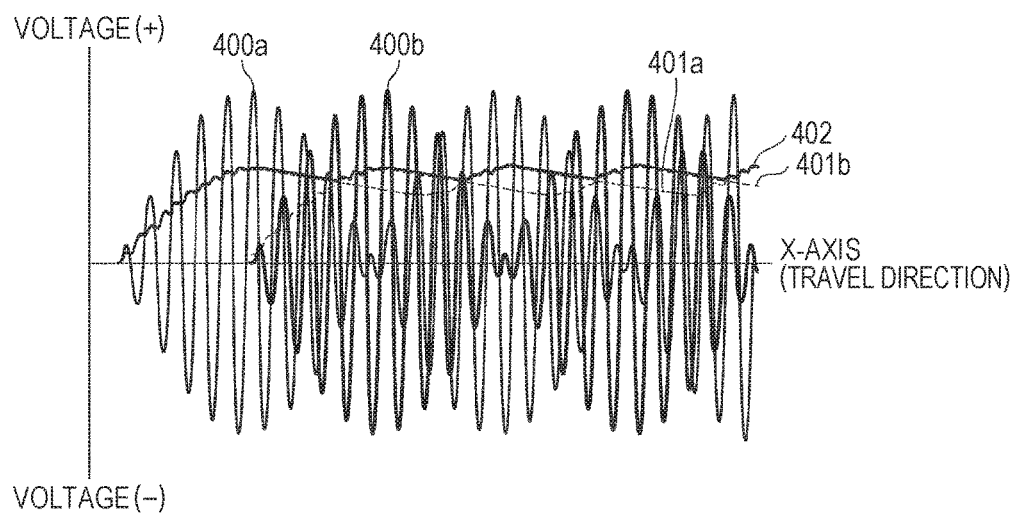
FIGS. 4A and 4B are graphs representing relationships between the position of a carriage, and an output voltage of an AM modulation circuit, a rectified output voltage, and a supply voltage to the carriage.
Figure 4B:
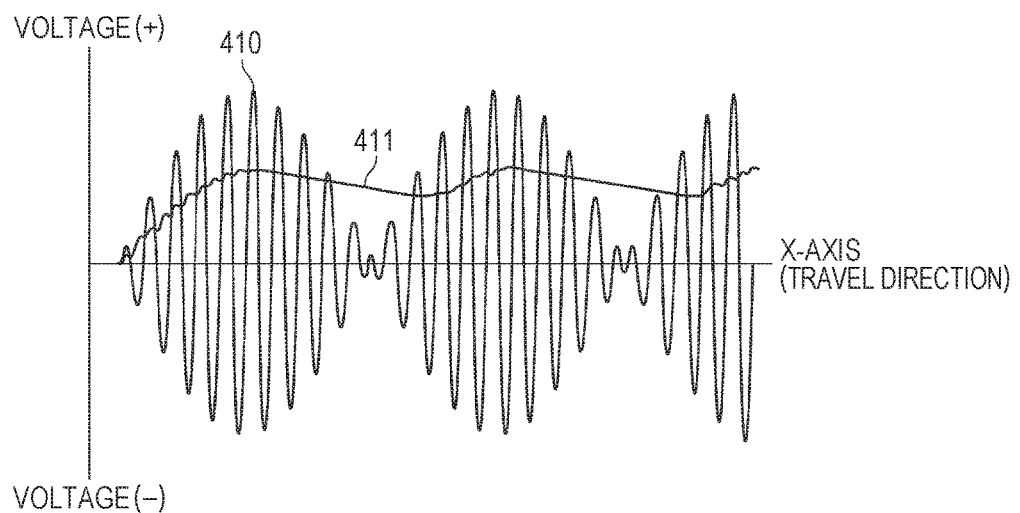

FIGS. 4A and 4B are graphs representing relationships between the position of the carriage 230 in the sub-scanning direction, and the output voltage of the AM modulation circuit, the rectified output voltage, and the supply voltage to the carriage 230. FIG. 4A shows the embodiment, and FIG. 4B shows the case where the carriage includes only one receiver coil. In FIGS. 4A and 4B, the X-axis represents the position of the carriage 230 in the sub-scanning direction.

When the positional relationship between the receiver coil and the transmitter coil changes, the coupling coefficient changes. Accordingly, the receiving voltage of the receiver coil changes. When the receiver coil and the transmitter coil are facing each other and the coupling coefficient between the receiver coil and the transmitter coil is at its highest, the receiving voltage is at its highest. Moreover, the receiving voltage drops as the receiver coil and the transmitter coil move away from the facing position. Hence, the receiving voltage is at its lowest when the center of the receiver coil is facing exactly the middle between adjacent transmitter coils.

If the carriage includes only one receiver coil, as an output voltage (a graph 410) of the AM modulation circuit fluctuates according to the positional relationship between the receiver coil and the transmitter coil, an output voltage (a graph 411) after the receiving voltage is rectified fluctuates, as shown in FIG. 4B. In the case of only one receiver coil, the rectified output voltage becomes the supply voltage as it is. Hence, the supply voltage may drop below the voltage required by the carriage.

Moreover, if the feeding voltage to be applied to the transmitter coil is increased to increase a minimum value of the supply voltage to or above the voltage required by the carriage, a maximum value of the supply voltage is excessively increased or the amount of power consumed is excessively increased. Accordingly, it is not appropriate.

It is necessary to provide a power storage mechanism such as a secondary battery or capacitor in the carriage to keep the supply voltage to the carriage at or above the required voltage and maintain the normal operation. If the power storage mechanism is provided, it becomes difficult to repeatedly operate the carriage at high speeds due to, for example, the weight of the power storage mechanism and the securing of charging time. Accordingly, productivity is reduced.

On the other hand, in the embodiment, the carriage 230 is provided with the two receiver coils 200a and 200b. The center interval D1 between the receiver coils 200a and 200b is 1.5 times the center interval D2 between the transmitter coils 210. To put it another way, the receiver coils 200a and 200b are placed so as to be out of phase by half a cycle of the arrangement of the transmitter coils 210.

Hence, when the center of one of the receiver coils is facing exactly the middle between adjacent transmitter coils, and the coupling coefficient between the one receiver coil and the transmitter coil is at its lowest, the other receiver coil is facing a different transmitter coil. Accordingly, the coupling coefficient between the other receiver coil and the different transmitter coil is at the highest.

Therefore, the receiving voltages of the receiver coils 200a and 200b fluctuates complementarily to each other such that as one of them drops, the other increases. In FIG. 4A, a receiving voltage 400a (a thin line graph) of the receiver coil 200a and a receiving voltage 400b (a thick line graph) of the receiver coil 200b fluctuate complementarily in accordance with the position of the carriage Hence, output voltages 401a (a small broken line graph) and 401b (a rough broken line graph) obtained by doubling and rectifying the receiving voltages of the receiver coils 200a and 200b also fluctuate complementarily. Accordingly, a supply voltage 402 (a thick line graph) being a combination of them is prevented from fluctuating.

When one of the receiver coils is facing the transmitter coil, even if the receiving voltage of the other receiver coil is below the voltage required by the carriage 230, the voltage required by the carriage 230 can be supplied. Consequently, even if the voltage to be applied to the transmitter coil is reduced, a high minimum supply voltage to the carriage 230 can be maintained. Accordingly, a reduction in the energy consumption of the scanner 101 can be promoted.

Figure 5A:
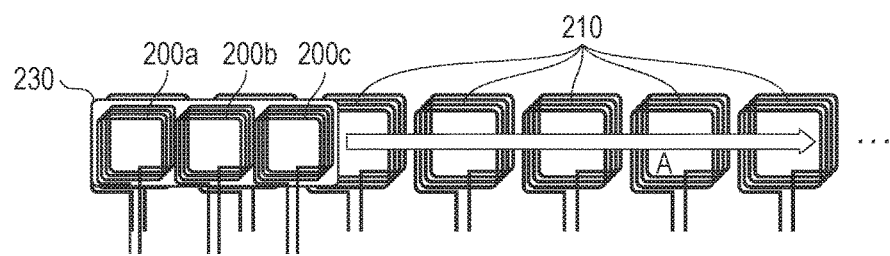
FIGS. 5A and 5B are diagrams illustrating a schematic configuration of a case of three receiver coils, and a supply voltage.
Figure 5B:
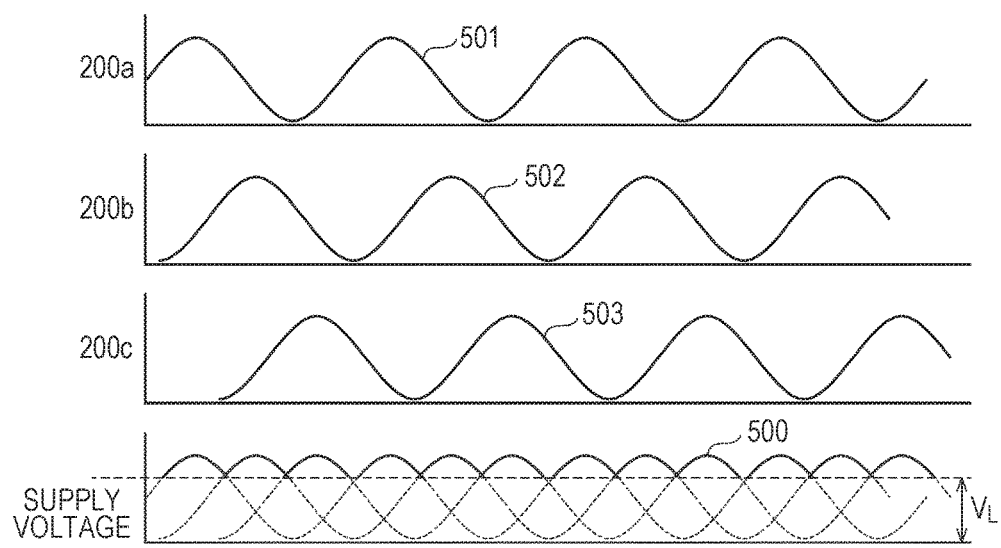

If the number of receiver coils to be attached to the carriage 230 is increased, a reduction in the supply voltage to the carriage 230 can be further suppressed. For example, if three receiver coils are provided, the receiver coils are simply required to be placed so as to be out of phase by one-third the cycle of the arrangement of the transmitter coils (FIG. 5A). Consequently, receiving voltages 501, 502, and 503 of the three receiver coils are one-third out of phase as schematically shown in FIG. 5B.

Therefore, when the receiving voltages 501, 502, and 503 are combined to generate a supply voltage 500 to the carriage 230, a minimum supply voltage $V_L$ to the carriage 230 can be further increased.

However, if the number of receiver coils to be attached to the carriage 230 is increased, the numbers of not only receiver coils but also AM modulation circuits and current doubler rectifier circuits need to be increased. Accordingly, there arises a problem such as that the weight and size of the carriage 230 are increased or cost increase is invited. Hence, the number of receiver coils to be attached to the carriage 230 needs to be determined by a trade-off between the effect that can be obtained by the embodiment and the problem accompanied by an increase in the number of receiver coils.

Second Embodiment

Next, a second embodiment of the present invention is described.

While including a substantially common configuration to that of the image forming apparatus according to the first embodiment, an image forming apparatus according to the embodiment is different in the respects that two transmitter coil rows 210 are provided along the sub-scanning direction, and the receiver coils 200 are provided accordingly. The embodiment is described below, focusing on the differences.

In the specification, the common reference numerals are assigned to the members common to the embodiments.

Figure 6A:
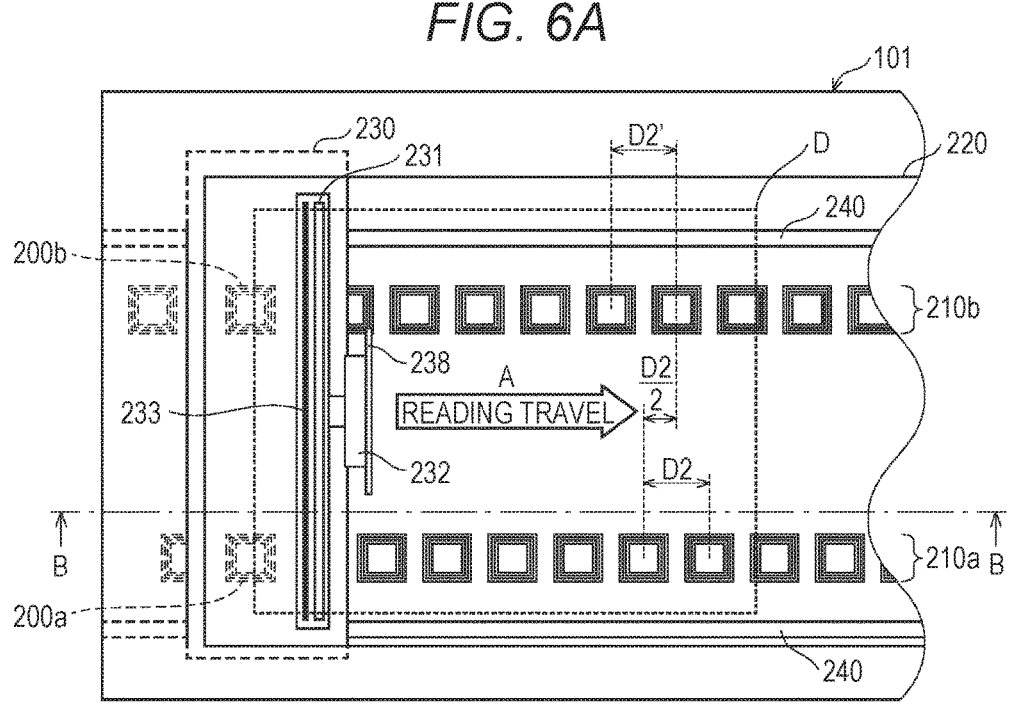
FIGS. 6A and 6B are diagrams showing the main configuration of the scanner according to a second embodiment.
Figure 6B:
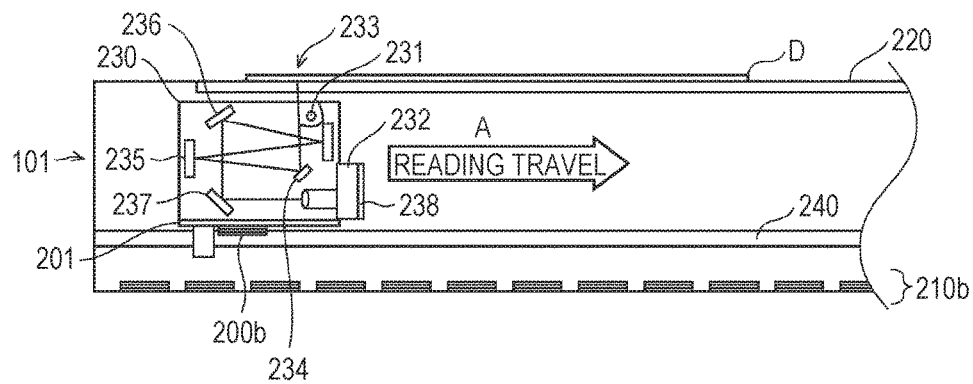

Firstly, the configuration of the scanner 101 is described. As shown in FIGS. 6A and 6B, the receiver coils 200a and 200b are attached to the carriage 230 so as to be at the same position in the sub-scanning direction and also be spaced apart in the main scanning direction.

Moreover, the apparatus body of the scanner 101 is provided with two transmitter coil rows 210a and 210b along the sub-scanning direction. The transmitter coil row 210a faces the receiver coil 200a, and the transmitter coil row 220b faces the receiver coil 200b.

The center interval D2 between transmitter coils 210 that are adjacent in the sub-scanning direction in the transmitter coil row 210a is equal to a center interval D2' between transmitter coils 210 that are adjacent in the sub-scanning direction in the transmitter coil row 210b. Moreover, the transmitter coil row 210a is located so as to be misaligned by half the center interval D2 between the transmitter coils 210, that is, D2/2, with the transmitter coil row 210b in the sub-scanning direction.

Hence, when one of the receiver coils 200a and 200b is facing a transmitter coil 210, the center of the other receiver coil is located at the middle between adjacent transmitter coils 210. Hence, the receiving voltages of the receiver coils 200a and 200b fluctuate complementarily. Accordingly, the fluctuation of the supply voltage to the carriage 230 is suppressed. In addition, the minimum supply voltage can be increased.

Furthermore, two transmitter coil rows are provided in the embodiment; accordingly, the intervals D2 and D2' between transmitter coils in the transmitter coil rows 210a and 210b can be increased as compared to the first embodiment. Hence, the magnetic interference between adjacent transmitter coils in the transmitter coil row can be reduced. Moreover, as compared to the placement of the plurality of the receiver coils 200a and 200b with respect to the travel direction of the carriage 230, the travel area of the carriage 230 can be extended, and the size of the scanner 101 can be reduced.

Third Embodiment

Next, a third embodiment of the present invention is described.

While including a substantially common configuration to that of the image forming apparatus according to the first embodiment, an image forming apparatus according to the embodiment is different in the respect that a receiver coil and each transmitter coil forming a transmitter coil row change their attitude in step with the travel of the carriage. The embodiment is described below, focusing on the difference.

(3-1) The Configuration of the Scanner 101

Firstly, the configuration of the scanner 101 is described.

Figure 7A:
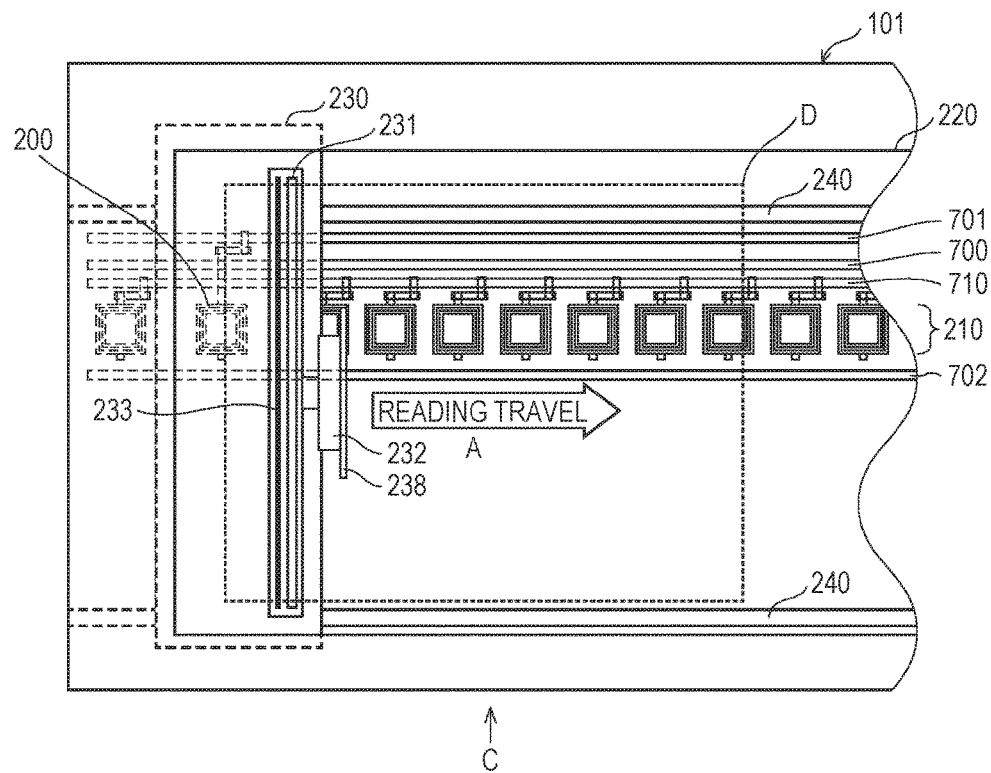
FIGS. 7A and 7B are diagrams showing the main configuration of the scanner.
Figure 7B:
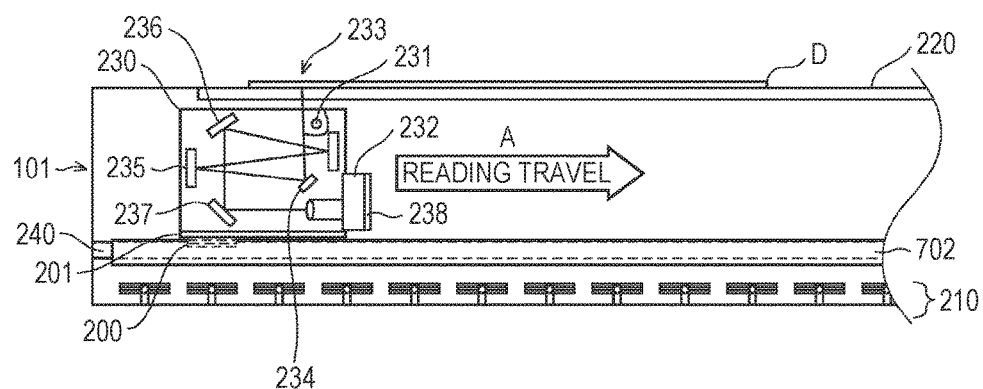

FIGS. 7A and 7B are diagrams showing the main configuration of the scanner 101. FIG. 7A is a plan view, and FIG. 7B is a cross-sectional perspective view when viewed from the front (the direction of the arrow C) in FIG. 7A.

As shown in FIGS. 7A and 7B, the apparatus body of the scanner 101 is provided with guide plates 700, 701, 702, and 710. All of the guide plates 700, 701, 702, and 710 are plate-shaped members that are extra-long in the sub-scanning direction.

The guide plates 700, 701, and 702 are fixed to the apparatus body of the scanner 101, and oscillates the receiver coil 200 as the carriages 230 travels in the sub-scanning direction. As the carriage 230 travels in the sub-scanning direction, an unillustrated drive source reciprocates the guide plate 710 in the sub-scanning direction to oscillate the transmitter coils 210.

(3-2) The Oscillation mechanism of the Receiver Coil 200

Next, an oscillation mechanism for oscillating the receiver coil 200 is described.

Figure 8A:
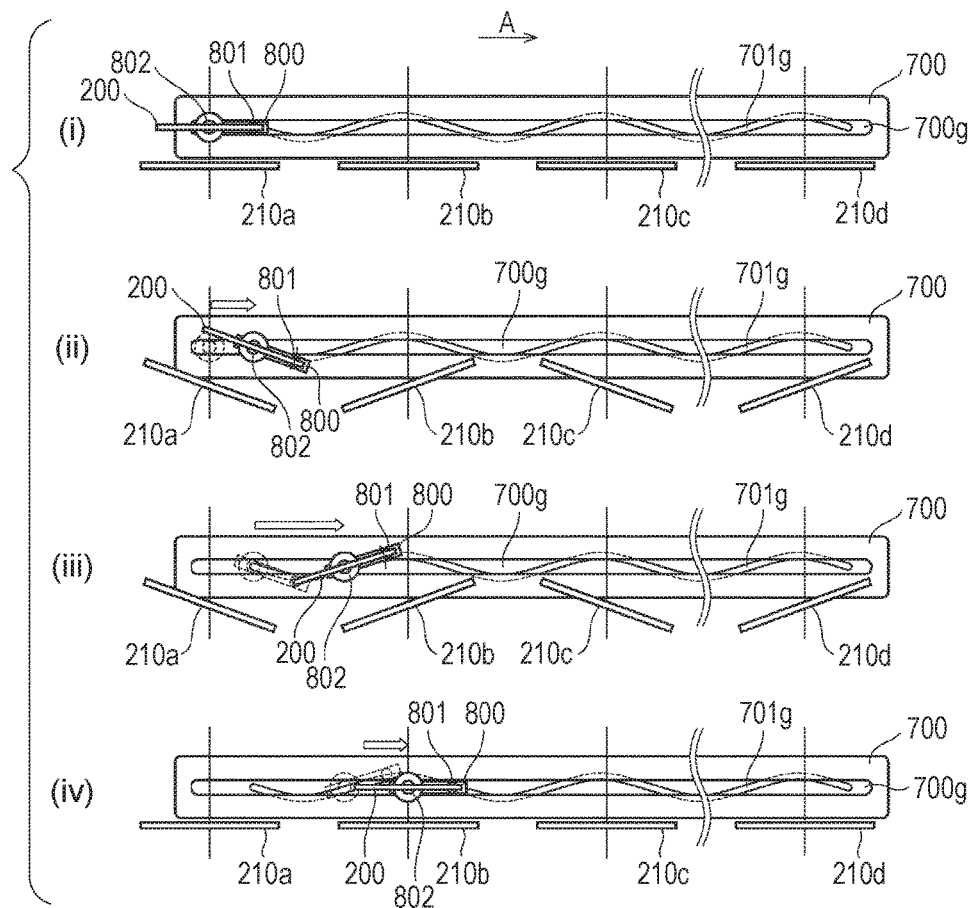
FIG. 8A is a front view of an oscillation mechanism of the receiver coil.
Figure 8B:
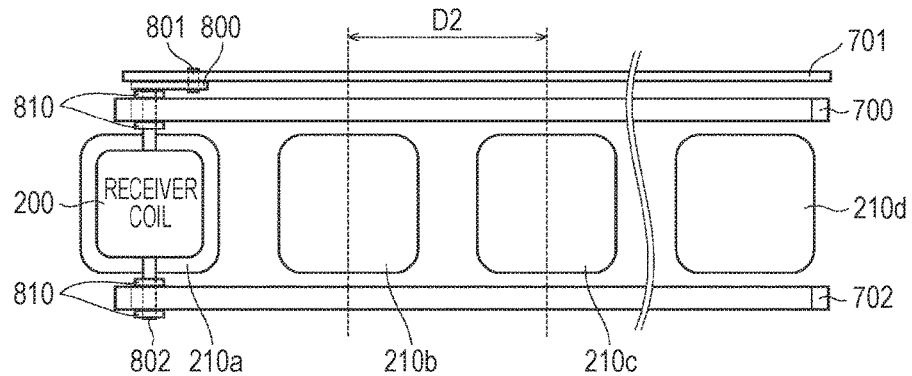
FIG. 8B is a plan view of the oscillation mechanism of the receiver coil.

FIG. 8A is a front view of the oscillation mechanism of the receiver coil 200, and FIG. 8B is a plan view.

The receiver coil 200 oscillates about a rock shaft 802. The rock shaft 802 is oriented in the main scanning direction, and is fixed to the receiver coil 200 such that the axis of the rock shaft 802 is orthogonal to the coil axis at the center of the receiver coil 200.

The guide plates 700 and 702 are provided with guide holes 700g and 702g. The guide holes 700g and 702g are straight through-holes that are extra-long in the sub-scanning direction. The rock shaft 302 is provided so as to penetrate the guide holes 700g and 702g. Consequently, the rock shaft 802 is guided in the sub-scanning direction as the carriage 230 travels.

An arm 800 is fixed on a side of the rock shaft 802, the side being opposite to the receiver coil 200 across the guide plate 700. The arm 800 is a flat plate-shaped member. The rock shaft 802 is perpendicular to one principal surface of the arm 800. A guide pin 801 is fixed at a position, which is different from the fixing position of the rock shaft 802, of the arm 800. The guide pin 801 is a columnar member, and is perpendicular to the other principal surface of the arm 800.

Washers 810 are fitted to the rock shaft 802 so as to sandwich the guide holes 700g and 702g of the guide plates 700 and 702.

The transmitter coils 210 are lined up at regular intervals in the sub-scanning direction. The distance between the center of the rock shaft 802 and the center of the guide pin 801 is equal to a quarter of the center interval D2 between transmitter coils 210 that are adjacent in the sub-scanning direction.

The guide plate 701 is provided with a guide hole 701g. The guide hole 701g is a wave-shaped through-hole that is extra-long in the sub-scanning direction. The guide pin 801 is inserted into the guide hole 701g. Consequently, the guide pin 801 is guided in the sub-scanning direction, moving up and down, as the carriage 230 travels.

Especially, the guide hole 701g is at its highest at a position corresponding to the center of each transmitter coil 210 in the sub-scanning direction. Moreover, the guide hole 701g is at its lowest at a position corresponding to the middle between adjacent transmitter coils 210. Furthermore, the guide hole 701g and the guide hole 700g are at the same height at a position corresponding to the middle between the center of the transmitter coil 210 and the midpoint between adjacent transmitter coils 210 (a position D2/4 away from the center of the transmitter coil 210).

Hence, if the rock shaft 802 is at the position corresponding to the center of the transmitter coil 210 or at the position corresponding to the middle between adjacent transmitter coils 210, in the sub-scanning direction, the guide pin 801 is at the position corresponding to the middle between center of the transmitter coil 210 and the midpoint between adjacent transmitter coils 210.

Therefore, the rock shaft 802 is at the same height as the guide pin 801. Accordingly, the coil axis of the receiver coils 200 is vertical, and the coil plane is horizontal. Especially if the rock shaft 802 is at the position corresponding to the center of the transmitter coil 210 in the sub-scanning direction, the receiver coil 200 is facing the transmitter coil 210a as shown in (i) of FIG. 8A. Accordingly, the coupling coefficient is increased to its highest.

When the rock shaft 802 travels from the position of (i) of FIG. 8A to the position of (ii) of FIG. 8A, the height of the rock shaft 802 to be guided along the guide hole 700g does not change. However, the height of the guide pin 801 to be guided along the guide hole 701g is reduced. Consequently, the receiver coil 200 oscillates so as to orient the coil axis of the receiver coil 200 toward the transmitter coil 210a.

When the rock shaft 802 travels from the position of (ii) of FIG. 8A to the position of (iii) of FIG. 8A through the midpoint between the transmitter coils 210a and 210b, the height of the rock shaft 802 does not change. However, the guide pin 801 is guided along the guide hole 701g to ascend. Consequently, the receiver coil 200 oscillates so as to orient the coil axis of the receiver coil 200 toward the transmitter coil 210b.

When the rock shaft 802 travels from the position of (iii) of FIG. 8A to the position of (iv) of FIG. 8A, the height of the rock shaft 802 does not change. However, the guide pin 801 is guided along the guide hole 701g to descend. As a result, the rock shaft 802 becomes the same height as the guide pin 801. Consequently, the receiver coil 200 faces the transmitter coil 210b.

When the carriage 230 travels further, the receiver coil 200 repeats such oscillations as described above.

(3-3) The oscillation Mechanism of the Transmitter Coil 210

Next, an oscillation mechanism for oscillating the transmitter coil 210 is described.

Figure 9A:
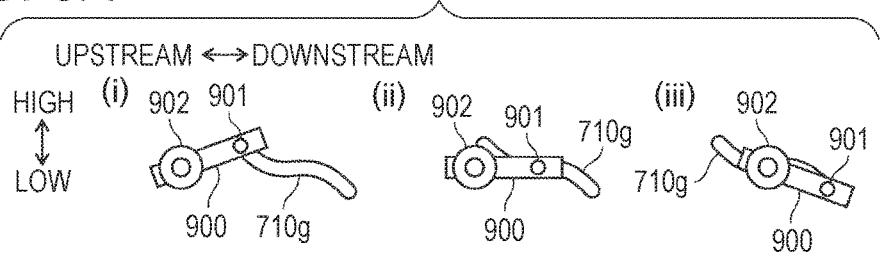
FIG. 9A is a diagram explaining a guide mechanism for oscillating a transmitter coil.
Figure 9B:
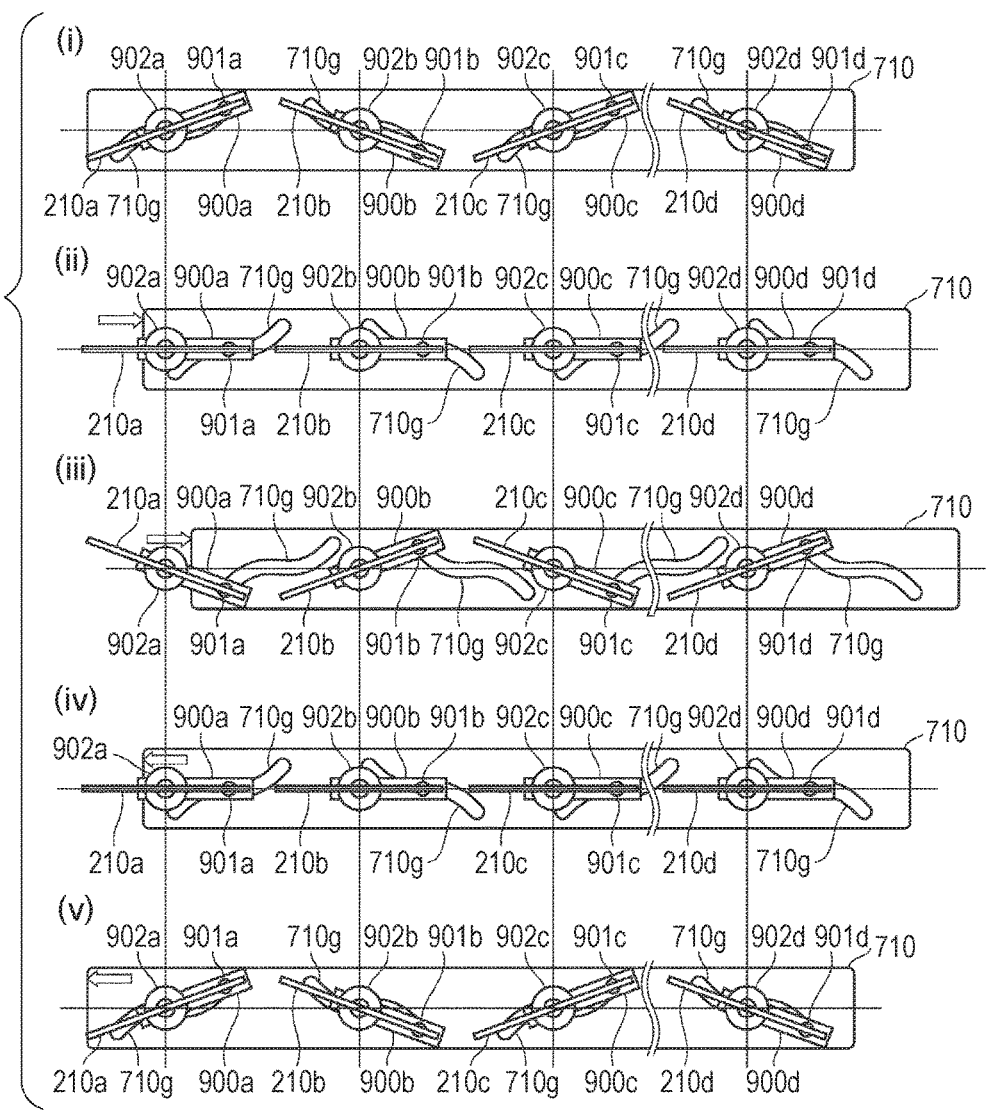
FIG. 9B is a diagram showing changes n the attitude of the transmitter coil of when a guide plate is reciprocated.

FIG. 9A is a diagram explaining a guide mechanism for oscillating the transmitter coil 210, and FIG. 9B is a diagram showing changes in the attitude of the transmitter coil 210 of when the guide plate 710 is reciprocated.

The transmitter coil 210 oscillates about a rock shaft 902. The rock shaft 902 is fixed at one end to the transmitter coil 210 so as to be oriented in a direction orthogonal to the travel direction of the carriage 230 in plan view, and cause its axis to be orthogonal to the coil axis at the center of the transmitter coil 210. The rock shaft 902 is rotatably supported by an unillustrated bearing.

An arm 900 is fixed at an end, which is opposite to the end fixed to the transmitter coil 210, of the rock shaft 902. The arm 900 is a flat plate-shaped member having a principal surface perpendicular to the rock shaft 902. A guide pin 901 is fixed at a position, which is different from the fixing position of the rock shaft 902, of the arm 900. The guide pin 901 is a columnar member, and is fixed perpendicularly to the other principal surface of the arm 900.

The guide plate 710 is provided with guide holes 710g. The guide pin 901 is inserted into the guide hole 710g. The guide hole 710g is shaped into an S form. In FIG. 9A, the upstream side of the guide hole 710g is higher and the downstream side thereof is lower. As shown in FIG. 9B, the guide plate 710 is provided with the guide holes 710g along the sub-scanning direction such that the heights of the ends of the guide holes 710g are alternately opposite to each other.

Hence, when the guide plate 710 travels downstream, the position of the guide pin 901 becomes higher than that of the rock shaft 902 as shown in (i) of FIG. 9A. Accordingly, the coil plane of the transmitter coil 210 is inclined. The embodiment has the configuration where the transmitter coil 210 is on an extension of the guide pin 901. However, the positional relationship between the guide pin 901 and the transmitter coil 210 may be changed according to the position and shape of the guide hole 710g.

When the guide plate 710 travels upward, the position of the guide pin 901 becomes lower than that of the rock shaft 902 as shown in (iii) FIG. 9A. Accordingly, the coil plane of the transmitter coil 210 is inclined toward a side opposite to (i) of FIG. 9A. Moreover, when the guide plate 710 is at the middle between them, the position of the guide pin 901 becomes the same in height as that of the rock shaft 902 as shown in (ii) of FIG. 9A. Accordingly, the coil plane of the transmitter coil 210 becomes horizontal.

The heights of the ends of the guide holes 710g provided along the sub-scanning direction are alternately opposite to each other as shown in (i) of FIG. 9B. Accordingly, when the guide plate 710 is on the upstream side, transmitter coils 210 that are adjacent in the sub-scanning direction oscillate toward opposite directions. Consequently, the coil planes of the transmitter coils 210 are inclined toward the alternate directions along the sub-scanning direction.

When the carriage 230 travels half the center interval D2, the guide plate 710 travels downstream accordingly, and shifts from the position of (i) of FIG. 9B to the position of (ii) of FIG. 9B. The guide pin 901 is guided from the downstream end to the center of the guide hole 710g. The transmitter coil 210 then oscillates to make its coil plane horizontal. In this state, the receiver coil 200 faces, for example, the transmitter coil 210a.

When the carriage 230 travels half the center interval D2 further, the guide plate 710 travels further downstream accordingly, and shifts from the position of (ii) of FIG. 9B to the position of (iii) of FIG. 9B. The guide pin 901 is guided to the upstream end of the guide hole 710g. Accordingly, the transmitter coil 210 oscillates further to incline its coil plane. The inclination angle of the coil plane of the transmitter coil 210 in (i) of FIG. 9B is opposite to the inclination angle of the coil plane of the transmitter coil 210 in (i) of FIG. 9B. In this state, the center of the receiver coil 200 is located, for example, at the middle between the transmitter coils 210a and 210b.

When the carriage 230 travels half the center interval D2 further, the guide plate 710 travels upstream in the opposite direction, and shifts from the position of (iii) of FIG. 9B to the position of (iv) of FIG. 9B (the same as the position of (ii) of FIG. 9B). The guide pin 901 is guided to the center of the guide hole 710g to make the coil plane of the transmitter coil 210 horizontal. In this state, the receiver coil 200 faces, for example, the transmitter coil 210b.

When the carriage 230 travels half the center interval D2 further, the guide plate 710 travels further upstream, and shifts from the position of (iv) of FIG. 9B to the position of (v) of FIG. 9B (the same as the position of (i) of FIG. 9B). The guide pin 901 is guided to the downstream end of the guide hole 710g to inline the coil plane of the transmitter coil 210. In this state, the center of the receiver coil 200 is located, for example, at the middle between the transmitter coil 210b and a transmitter coil 210c.

In this manner, the guide plate 710 reciprocates horizontally in step with the travel of the carriage 230. Accordingly, the transmitter coil 210 oscillates.

The carriage 230 is slid and moved by a wire in the sub-scanning direction, using an unillustrated stepping motor as a drive source. The current position of the carriage 230 is detected by counting the steps needed to travel from the home position to the current position.

Moreover, the guide plate 710 reciprocates using, for example, a rack and pinion mechanism. A pinion gear is rotationally driven by the stepping motor. The scanner 101 includes a control unit. The control unit rotates the stepping motor according to the position of the carriage 230. Accordingly, the position of the guide plate 710 in the sub-scanning direction is adjusted.

(3-4) The Magnetic Coupling between the Receiver Coil 200 and the Transmitter Coil 210

Next, the magnetic coupling (coupling coefficient) between the receiver coil 200 and the transmitter coil 210 is described.

FIGS. 10A and 10B are diagrams explaining a relationship between the positional relationship between the receiver coil 200 and the transmitter coil 210, and the coupling coefficient. FIG. 10A shows a case where the receiver coil 200 is moved while both the receiver coil 200 and the transmitter coil 210 keep their coil planes horizontal. Moreover, FIG. 10B shows a case where the attitudes of the receiver coil 200 and the transmitter coil 210 are changed as the receiver coil 200 travels.

When the receiver coil 200 and the transmitter coil 210 are facing each other as shown in (i) of FIG. 10A, the coupling coefficient between the receiver coil 200 and the transmitter coil 210 is at the highest.

However, when the receiver coil 200 travels parallel to deviate from the position facing the transmitter coil 210, magnetic flux 1001, which is indicated by broken lines, of the magnetic flux produced by the transmitter coil 210 does not pass through the receiver coil 200 as shown in (ii) of FIG. 10A and, accordingly does not contribute to the induced electromotive force. Hence, the receiving voltage drops. When the receiver coil 200 travels parallel further, magnetic flux 1002 that passes through the receiver coil 200 is reduced in amount. Accordingly, the receiving voltage drops further ((iii) of FIG. 10A).

On the other hand, if the attitudes of the receiver coil 200 and the transmitter coil 210 are changed in step with the travel of the receiver coil 200, t is possible to increase the coupling coefficient between the receiver coil 200 and the transmitter coil 210, and by extension, suppress a reduction in receiving voltage.

As shown in (i) of FIG. 10B, if in step with the travel of the receiver coil 200, the receiver coil 200 is inclined so as to orient its coil axis toward the transmitter coil 210a and also the transmitter coil 210a is inclined so as to orient its coil axis toward the receiver coil 200, the amount of magnetic flux passing through the receiver coil 200 among the magnetic flux produced by the transmitter coil 210a can be increased as compared to (ii) of FIG. 10A. In other words, a reduction in the coupling coefficient between the receiver coil 200 and the transmitter coil 210a can be suppressed. Accordingly, a reduction in receiving voltage can be suppressed.

When the receiver coil 200 is moved further, the inclination of the receiver coil 200 is reduced as shown in (ii) of FIG. 10B to make it easier for the magnetic flux produced by the next transmitter coil 210b lying ahead in the travel direction to pass through the receiver coil 200. Also in this sense, a reduction in the receiving voltage of the receiver coil 200 can be suppressed. The inclination of the receiver coil 200 is then further reduced as the carriage 230 travels. When the center of the receiver coil 200 reaches the middle between the transmitter coils 210a and 210b, the receiver coil 200 makes its coil plane horizontal.

The receiver coil 200 is then made horizontal to face the transmitter coil 210b as shown in (iii) of FIG. 10B, which enables the magnetic flux produced by the transmitter coil 210b to efficiently pass through the receiver coil 200. The reduction in receiving voltage can also be further suppressed halfway through the travel from the middle between the transmitter coils 210a and 210b to the position to face the transmitter coil 210b by inclining the receiver coil 200 so as to orient the coil axis of the receiver coil 200 toward the transmitter coil 210b and also inclining the transmitter coil 210b so as to orient the coil axis of the transmitter coil 210b toward the receiver coil 200.

Figure 11A:
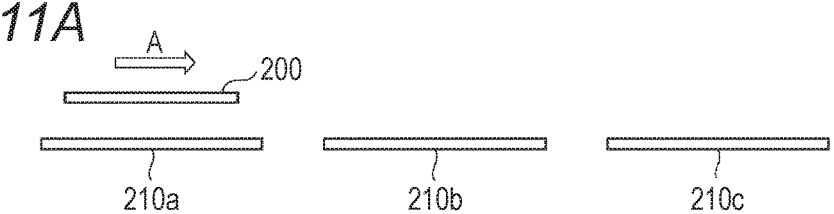
FIGS. 11A to 11E are diagrams showing a case where a transmitter coil downstream of the receiver coil is also inclined, where the inclined state changes from A to E as the carriage travels.

FIGS. 11A to 1E are diagrams illustrating a case where a transmitter coil 210 downstream of the receiver coil 200 is also inclined. When the center of the receiver coil 200 and the center of the transmitter coil 210a are at the same position in the sub-scanning direction as shown in FIG. 11A, if the coil planes of both the receiver coil 200 and the transmitter coil 201a are made horizontal, their coil axes overlap each other. Therefore, the receiver coil 200 faces the transmitter coil 210a; accordingly, the coupling coefficient and the receiving voltage are increased to their highest.

Figure 11B:
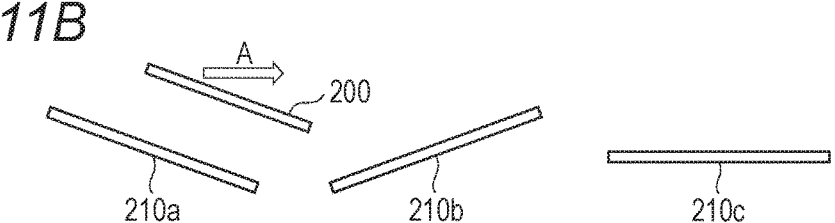

When the receiver coil 200 travels from the state of FIG. 11A in the direction of the arrow A as shown in FIG. 11B, the receiver coil 200 is oscillated so as to orient the coil axis of the receiver coil 200 toward the transmitter coil 210a and also the transmitter coil 210a is oscillated so as to orient the coil axis of the transmitter coil 210a toward the receiver coil 200; accordingly, a reduction in receiving voltage is suppressed. In this case, the transmitter coil 210b is oscillated in advance so as to be in an orientation opposite to the orientation of the transmitter coil 210a.

Figure 11C:
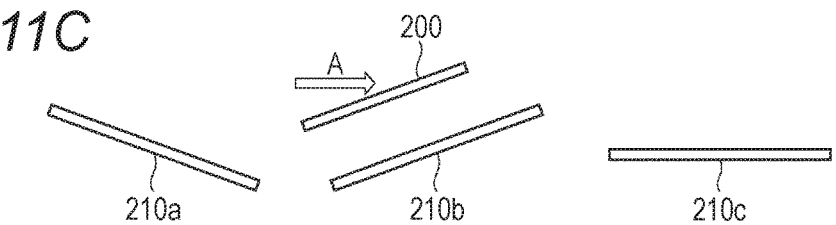

When the receiver coil 200 travels further from the state of FIG. 11B in the direction of the arrow A as shown in FIG. 11C, the receiver coil 200 is oscillated so as to orient the coil axis of the receiver coil 200 toward the transmitter coil 210b to increase the receiving voltage from the transmitter coil 210b as much as possible. The transmitter coil 210b has been oscillated in advance so as to orient the coil axis toward the receiver coil 200.

Figure 11D:
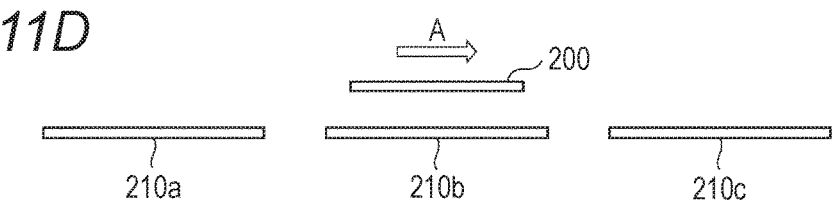
Figure 11E:
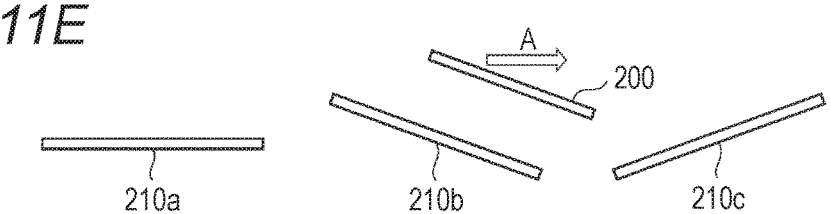

When the receiver coil 200 travels further from the state of FIG. 11C in the direction of the arrow A and faces the transmitter coil 210a as shown in FIG. 11D, the coupling coefficient and the receiving voltage are increased again to the highest. When the receiver coil 200 travels further to enter the state shown in FIG. 11E, the receiver coil 200 and the transmitter coils 210b and 210c are oscillated as in FIG. 11B; accordingly, a reduction in receiving voltage can be suppressed.

In this manner, the above-mentioned oscillation mechanism oscillates both the receiver coil 200 and the transmitter coil 210 to enable the suppression of a reduction in receiving voltage. Therefore, it is possible to suppress a reduction in the quality of a scanned image due to a change in the intensity of light of the light source. Moreover, the feeding voltage to the transmitter coil 210 can be reduced; accordingly, power consumption can also be reduced.

[4] Fourth Embodiment

Next, a fourth embodiment of the present invention is described.

While including a substantially common configuration to that of the image forming apparatus according to the first embodiment, an image forming apparatus according to the embodiment, is different in the respect that the travel speed of the receiver coil is changed nonlinearly by reciprocating the receiver coil in the horizontal direction with respect to the carriage in step with the travel of the carriage. The embodiment is described below, focusing on the difference.

(4-1) The Configuration of the Carriage 230

Firstly, the configuration of the carriage 230 according to the embodiment is described.

As shown in. FIGS. 12A to 12E, the carriage 230 includes a cam 1201 that rotates in the direction of an arrow D as the carriage 230 travels, a guide pin 1202 biased toward the cam in the horizontal direction, a guide hole 1203 that guides the guide pin 1202 in the horizontal direction, and an arm 1204 that fixes the receiver coil 200 and the power supply circuit board 201 to the guide pin 1202.

Figure 12A:
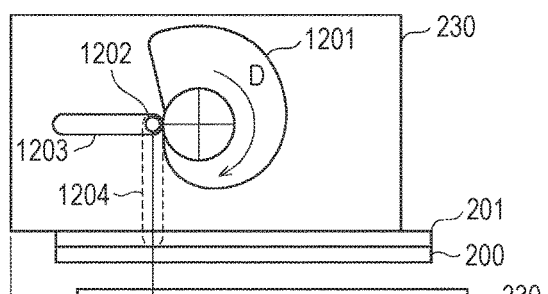
FIGS. 12A to 12E are diagrams showing a mechanism that reciprocates the receiver coil with respect to the carriage, where the state changes from A to F as the carriage travels.

As shown in FIG. 12A, when the guide pin 1202 is in contact at a location where the radius of the cam 1201 is smallest, an unillustrated biasing unit presses the guide pin 1202 against the cam 1201. Accordingly, the guide pin 1202 is located most downstream in the guide hole 1203. The receiver coil 200 is fixed to the guide pin 1202 via the arm 1204, and accordingly is located most downstream with respect to the carriage 230.

Figure 12B:
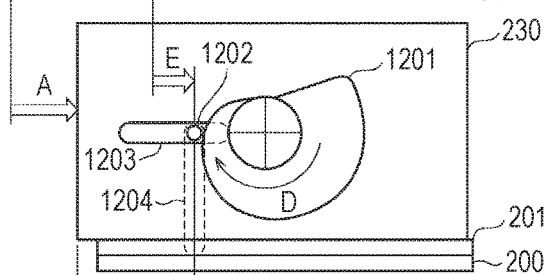

When the cam 1201 is rotated 90 degrees from the state shown in FIG. 12A in the direction of the arrow D in step with the travel of the carriage 230, the radius of the cam 1201 at the position in contact with the guide pin 1202 is increased as shown in FIG. 12B. Accordingly, the guide pin 1202 is guided along the guide hole 1203 to travel upstream in the carriage 230. Consequently, the travel distance of the guide pin becomes smaller than a travel distance A of the carriage 230 as indicated by an arrow E. The receiver coil 200 also travels upstream with respect to the carriage 230.

When the cam 1201 is further rotated 90 degrees from the state shown in FIG. 12B in the direction of the arrow D in step with the travel of the carriage 230, the radius of the cam 1201 at the position in contact with the guide pin 1202 is further increased as shown in FIG. 12O. Accordingly, the guide pin 1202 is guided along the guide hole 1203 to travel further upstream in the carriage 230. Consequently, the travel distance of the guide pin becomes smaller than the travel distance A of the carriage 230 as indicated by an arrow F. The receiver coil 200 also travels further upstream with respect to the carriage 230.

Figure 12C:
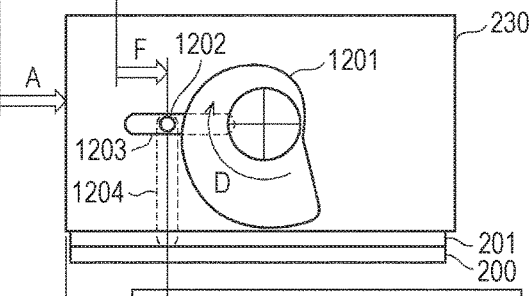

When the cam 1201 is further rotated 90 degrees from the state shown in FIG. 12C in the direction of the arrow D in step with the travel of the carriage 230, the radius of the cam 1201 at the position in contact with the guide pin 1202 is further increased as shown in FIG. 12C. Accordingly, the guide pin 1202 is guided along the guide hole 1203 to travel further upstream. Consequently, the travel distance of the guide pin becomes smaller than the travel distance A of the carriage 230 as indicated by an arrow G. The receiver coil 200 also travels further upstream with respect to the carriage 230.

Figure 12D:
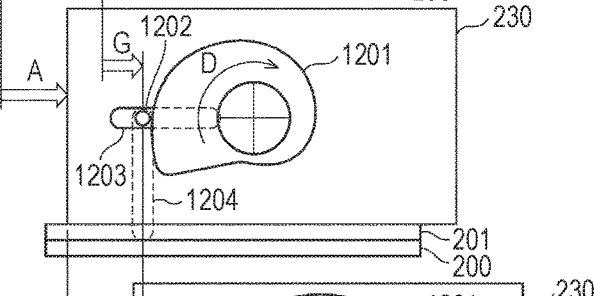
Figure 12E:
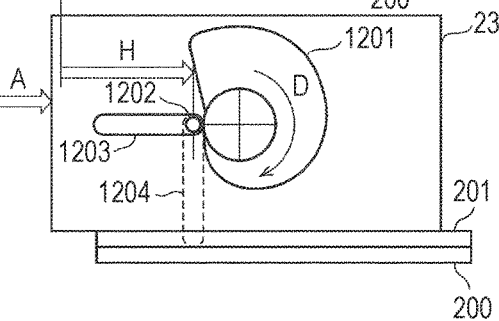

When the cam 1201 is further rotated 90 degrees from the state shown in FIG. 12D in the direction of the arrow D in step with the travel of the carriage 230, the radius of the cam 1201 at the position in contact with the guide pin 1202 returns to the smallest as shown in FIG. 12E. Accordingly, the guide pin 1202 is guided along the guide hole 1203 to travel most downstream. Consequently, the travel distance of the guide pin becomes larger than the travel distance A of the carriage 230 as indicated by an arrow H. The receiver coil 200 also travels most downstream with respect to the carriage 230 to return to the state of FIG. 12A.

Consequently, when the carriage 230 travels with constant speed, the travel speed of the receiver coil 200 can be changed nonlinearly.

(4-2) The Positional Relationship between the Receiver Coil 200 and the Transmitter Coil 210

Next, the positional relationship between the receiver coil 200 and the transmitter coil 210 is described.

In the embodiment, the carriage 230 has such a configuration as described above. Accordingly, when the carriage 230 travels, the time during which the receiver coil 200 and the transmitter coil 210 are overlapping with each other in plan view is increased.

FIGS. 13A to 13G are diagrams representing changes in the positional relationship between the receiver coil 200 and the transmitter coil 210 in step with the travel of the carriage 230.

In FIG. 13A, the receiver coil 200 and the transmitter coil 210 are substantially facing each other. Accordingly, the coupling coefficient is high; therefore, the receiving voltage is also high. In contrast, as shown in FIGS. 13B, 13C, and 13D, the receiver coil 200 travels upstream relative to the carriage 230 as the carriage 230 travels in the sub-scanning direction. The speed at which the receiver coil 200 moves away from the position to face the transmitter coil 210 is then reduced. Hence, the time during which the receiver coil 200 and the transmitter coil 210a. are overlapping with each other in plan view is increased. Accordingly, a reduction in coupling coefficient can be suppressed. Therefore, a reduction in receiving voltage can be suppressed as compared to the case where the receiver coil 200 is fixed to the carriage 230.

When the carriage 230 then travels further and the coupling coefficient between the receiver coil 200 and the transmitter coil 210b can be made higher than the coupling coefficient between the receiver coil 200 and the transmitter coil 210a, the receiver coil 200 is moved downstream relative to the carriage 230 to substantially face the transmitter coil 210b as shown in FIG. 13E. If the shape of the cam 1201 is set on the basis of the positional relationship between the receiver coil 200 and the transmitter coil 210 such that the voltage is changed in this manner, the coupling coefficient between the receiver coil 200 and the transmitter coil 210b is increased. Accordingly, the receiving voltage can be increased.

When the carriage 230 travels further, the receiver coil 200 s moved upstream relative to the carriage 230 as in the above description. Accordingly, a reduction in the coupling coefficient between the receiver coil 200 and the transmitter coil 210b is suppressed. (FIGS. 13F and 13G).

It is needless to say that the mechanism that reciprocates the receiver coil 200 with respect to the carriage 230 is not limited to the above-mentioned cam mechanism. Another mechanism may be used to reciprocate the receiver coil 200.

(4-3) Operation Example

Figure 14:
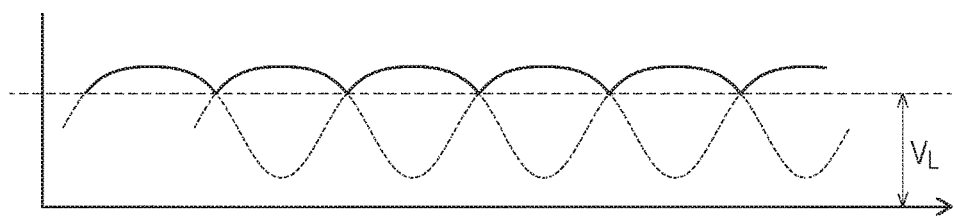
FIG. 14 is a graph showing a relationship between the position of the carriage and the supply voltage.

For example, if two receiver coils 200 are reciprocated half out of phase with each other in the second embodiment, a reduction in the receiving voltages of both of the receiver coils 200 can be suppressed. The state where the receiving voltage is high can be maintained for a longer period of time. Therefore, as shown in FIG. 14, the minimum supply voltage $V_L$ to the carriage 230 can be increased. In FIG. 14, the horizontal axis represents the position of the carriage 230 in the travel direction, and the vertical axis represents the magnitude of the supply voltage to the carriage 230. In this manner, according to the embodiment, the state where the receiving voltage is high can be long maintained; accordingly, a reduction in receiving voltage can be suppressed, and also the amplitude of fluctuations in receiving voltage can be reduced.

[5] Fifth Embodiment

Next, a fifth embodiment of the present invention is described.

While including a substantially common configuration to that of the image forming apparatus according to the first embodiment, an image forming apparatus according to the embodiment is different in the respect that the transmitter coils are reciprocated in step with the travel of the carriage to nonlinearly change the travel speed of the transmitter coils. The embodiment is described below, focusing on the difference.

(5-1) The Drive Mechanism of the Transmitter Coils 210

Firstly, a drive mechanism of the transmitter coils 210 is described.

Figure 15:
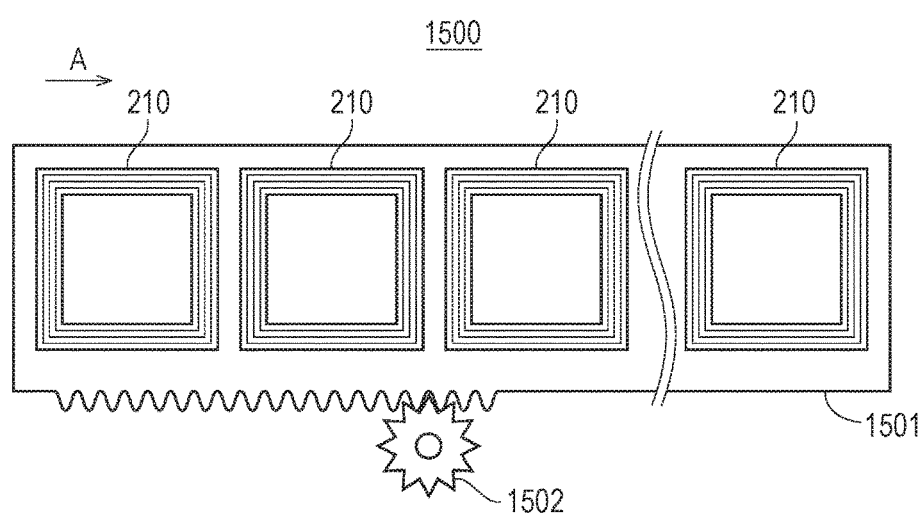
FIG. 15 is a diagram showing a drive mechanism for reciprocating the transmitter coils with respect to an apparatus body of the scanner.

The apparatus body of the scanner 101 according to the embodiment is provided with such a drive mechanism 1500 of the transmitter coils 210 as shown in FIG. 15.

The drive mechanism 1500 is what is called a rack and pinion mechanism. A pinion gear 1502 engages with teeth provided to one side of a flat plate-shaped rack 1501 that is extra-long and rectangular in plan view. The transmitter coils 210 are fixed on a principal surface of the rack 1501. As the rotation of the pinion gear 1502 reciprocates the rack 1501 in the sub-scanning direction, the transmitter coils 210 also reciprocate.

(5-2) The Positional Relationship between the Receiver Coil 200 and the Transmitter Coil 210

Next, the positional relationship between the receiver coil 200 and the transmitter coil 210.

Such a drive mechanism 1500 of the transmitter coils 210 as described above is provided to increase the time during which the receiver coil 200 and the transmitter coil 210 are overlapping with each other in plan view, when the carriage 230 travels.

In FIG. 16A, the receiver coil 200 and the transmitter coil 210a are substantially facing each other. Accordingly, the coupling coefficient is high; therefore, the receiving voltage is also high. When the carriage 230 travels from this state, the pinion gear 1502 rotates in step with the travel, the rack 1501 travels a distance I as shown in FIG. 16B. The travel distance I of the transmitter coil 210a is smaller than the travel distance A of the receiver coil 200; accordingly, the coupling coefficient is reduced.

However, as compared to the case where the transmitter coil 210a is fixed to the main body of the scanner 101, the speed at which the receiver coil 200 and the transmitter coil 210a move away from the facing position is reduced. Accordingly, a reduction in coupling coefficient can be suppressed. Therefore, a reduction in receiving voltage can be suppressed.

Also when, as shown in FIG. 16C, the carriage 230 travels further from the state shown in FIG. 16B, and the transmitter coil 210a travels further in the direction of an arrow J, the speed at which the receiver coil 200 and the transmitter coil 210a move away from the facing position is reduced as compared to the case where the transmitter coil 210a is fixed to the main body of the scanner 101. Consequently, a reduction in coupling coefficient can be suppressed; accordingly, a reduction in receiving voltage can be suppressed.

Also in a case of shifting from the state shown in FIG. 16C to the state shown in FIG. 16D, a reduction in receiving voltage is similarly suppressed.

When the carriage 230 travels further from the state shown in FIG. 16D, the rack 1501 returns to the upstream side as shown in FIG. 16E. Accordingly, the transmitter coil 210b faces the receiver coil 200 in turn. Therefore, the coupling coefficient between them is increased to the highest to increase the receiving voltage to the highest.

In this manner, according to the embodiment, a reduction in receiving voltage can be suppressed. Moreover, as compared to the case where the receiver coil 200 is reciprocated with respect to the carriage 230 as in the fourth embodiment, the configuration of the carriage 230 is simplified and also it becomes difficult to vibrate. Therefore, a reduction in the quality of a scanned image due to vibrations can also be prevented.

[6] Sixth Embodiment

Next, a sixth embodiment of the present invention is described.

While including a substantially common configuration to that of the image forming apparatus according to the first embodiment, an image forming apparatus according to the embodiment is different in the respect that the interval between the transmitter coils is changed according to the document size. The embodiment is described below, focusing on the difference.

(6-1) The Drive Mechanism of the Transmitter Coils 210

Generally, the scanner 101 may read documents of various sizes. Especially when reading a small size document, the scanner 101 requires higher productivity than when reading a large size document. Hence, the scanner 101 according to the embodiment includes a drive mechanism of the transmitter coils 210 as described below.

Figure 17A:
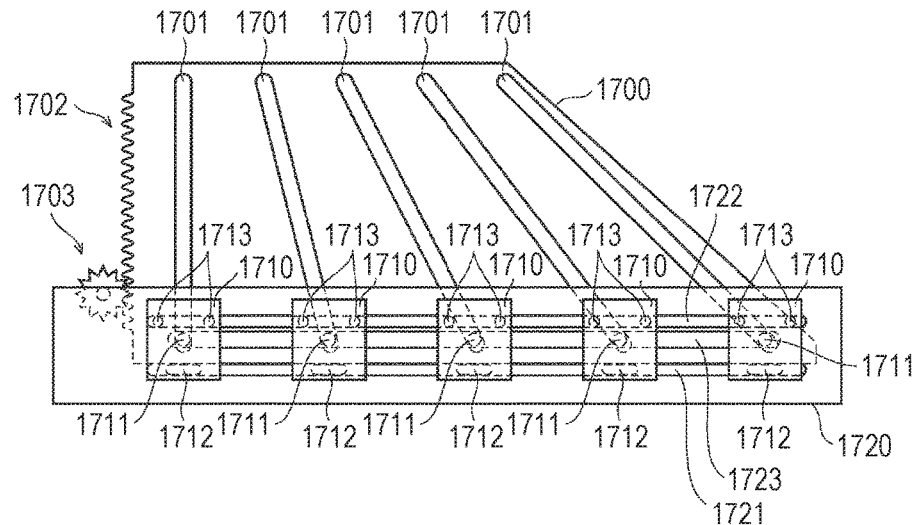
FIGS. 17A and 17B are plan views showing a drive mechanism of the transmitter coils.
Figure 17B:
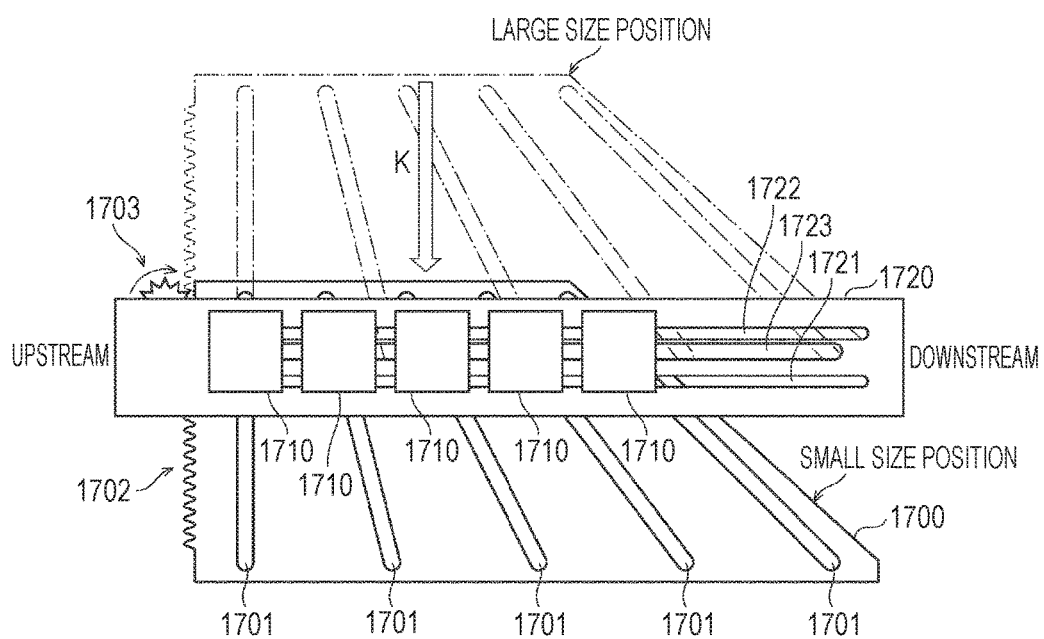

FIGS. 17A and 17B are plan views showing a drive mechanism of the transmitter coils 210. FIG. 17A shows the case of reading a large size document, and FIG. 17B shows the case of reading a small size document.

As shown in FIG. 17A, the scanner 101 includes a travel guide plate 1700 as the drive mechanism of the transmitter coils 210. The travel guide plate 1700 is provided at one end with a rack 1702 whose teeth engage with a pinion gear 1703. The rotation of the pinion gear 1703 reciprocates the travel guide plate 1700 in the main scanning direction.

The travel guide plate 1700 is provided with a plurality of travel holes 1701 for changing the interval between the transmitter coils 210 in the sub-scanning direction. An interval between the travel holes 1701 is increasingly reduced from the front to the back of the image forming apparatus 1.

A fixed guide plate 1720 is placed on the travel guide plate 1700. The fixed guide plate 1720 is fixed to the apparatus body of the scanner 101. The fixed guide plate 1720 is provided with slide holes 1721, 1722, and 1723.

Support plates 1710 are placed on the fixed guide plate 1720. The transmitter coils 210 (illustration omitted) are respectively attached to upper surfaces of the support plates 1710. A travel pin 1711, a slide guide pin 1712, and a slide roller 1713 are provided to a lower surface of the support plate 1710.

The travel pin 1711 penetrates the slide hole 1723 of the fixed guide plate 1720, and is inserted into the travel hole 1701 of the travel guide plate 1700. The slide guide pin 1712 is inserted into the slide hole 1721. The slide roller 1713 is inserted into the slide hole 1722.

Hence, when the pinion gear 1703 rotates to move the travel guide plate 1700 from the back to the front of the image forming apparatus 1 in the direction of an arrow K, the travel pin 1711 is guided along the travel hole 1701 from the downstream side to the upstream side of the carriage 230 in the sub-scanning direction, as shown in FIG. 17B.

At the same time, the slide guide pin 1712 is guided along the slide hole 1721, and the slide roller 1713 along the slide hole 1722 from the downstream side to the upstream side in the sub-scanning direction. Consequently, the rotation of the support plate 1710 is prevented.

Consequently, the interval between the support plates 1710 can be changed by the rack arid pinion mechanism. Accordingly, the interval between the transmitter coils 210 can be changed. As the document size is increased, the interval between the transmitter coils 210 is increased as shown in FIG. 18A. Accordingly, an image can be read from the entire large size document.

Moreover, as the document size is reduced, the interval between the transmitter coils 210 is reduced. Accordingly, the gap between the transmitter coils 210 is eliminated as shown in FIG. 18B. Accordingly, the receiving voltage can be maintained high. Therefore, when a small size document is read, the receiving voltage can be increased.

[7] Seventh Embodiment

Next, a seventh embodiment of the present invention is described.

While including a substantially common configuration to that of the image forming apparatus according to the first embodiment, an image forming apparatus according to the embodiment is different in the respect that the feeding voltage to be applied to the transmitter coil is changed according to the position of the carriage. The embodiment is described below, focusing on the difference.

(7-1) The Configuration of the Scanner 101

The configuration of the scanner 101 according to the embodiment is similar to that of the scanner 101 according to the first embodiment, excluding the configuration of a feed circuit that supplies power to the transmitter coil 210.

In other words, the transmitter coils 210 are lined up at regular intervals along the travel direction of the carriage 230. The receiver coils 200a and 200b are lined up in the sub-scanning direction. The receiver coil 200a is located upstream, and the receiver coil 200b is located downstream. The center interval D1 between the receiver coils 200a and 200b is 1.5 times the center interval D2 between the transmitter coils 210. Therefore, the receiver coils 200a and 200b alternately face the transmitter coils 210 as the carriage 230 travels.

(7-2) The Configuration of the Feed Circuit

Figure 19:
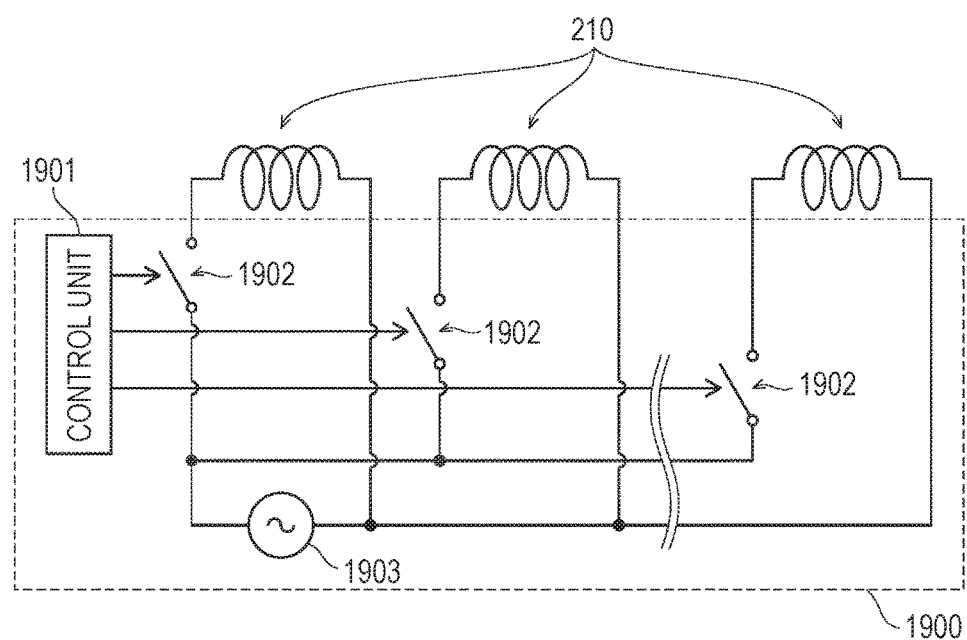
FIG. 19 is a circuit diagram showing the main configuration of a feed circuit.

Next, the configuration of the feed circuit that applies the feeding voltage of the transmitter coil 210 is described. As shown in FIG. 19, a feed circuit 1900 includes a control unit 1901, switches 1902 respectively for the transmitter coils 210, and a power supply 1903. The control unit 1901 turns on and off the switch 1902 according to the center position of the receiver coil 200a in the sub-scanning direction to apply the feeding voltage only to one transmitter coil 210 at a time.

Specifically, when the receiver coil 200a is closer to the position to face the transmitter coil 210 in the sub-scanning direction than the receiver coil 200b, the feeding voltage is applied to the transmitter coil 210 facing the receiver coil 200a, otherwise the feeding voltage is applied to the transmitter coil 210 facing the receiver coil 200b.

Figure 20A:
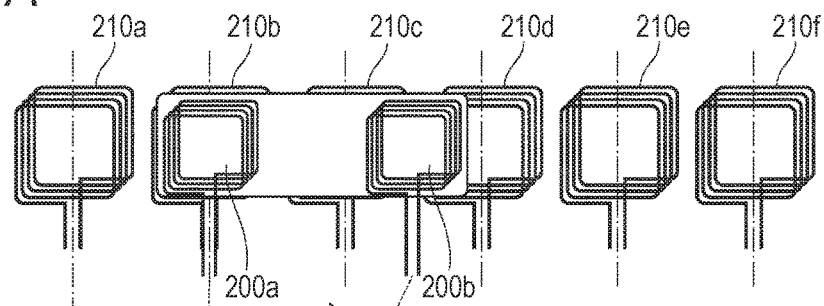
FIG. 20A illustrates the positional relationship between the receiver coils and the transmitter coils.

In an example of FIG. 20A, the receiver coil 200a is facing the transmitter coil 210b. Accordingly, the feeding voltage is being applied only to the transmitter coil 210b to generate the receiving voltage in the receiver coil 200a (2001). On the other hand, the feeding voltage is not being applied to the transmitter coils 210a, 210c, 210d and so forth other than the transmitter coil 210b. Accordingly, the receiving voltage is not generated in the receiver coil 200b (2002).

Figure 20B:
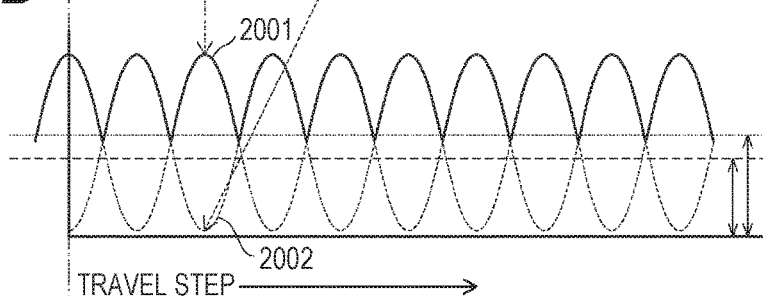
FIG. 20B is a graph showing a relationship between the position of the carriage and a receiving voltage.

However, as the carriage 230 travels, the feeding voltage is applied to the transmitter coil 210a and so forth that face the receiver coils 200a and 200b. Accordingly, as shown in FIG. 20B, changes in receiving voltage accompanied by the travel of the carriage 230 are similar to those of the first embodiment. The receiving voltages of the receiver coils 200a and 200b fluctuate complementarily to each other such that as one of them drops, the other increases (FIG. 20B).

Even if the feeding voltage is applied to a transmitter coil 210 that is not facing the receiver coil 200, when the transmitter coil 210 is not being magnetically coupled to the receiver coil 200, it does not contribute to the generation of the receiving voltage. Therefore, the receiving voltage does not change even if the feeding voltage is not applied to the transmitter coil 210 that does not contribute to the generation of the receiving voltage. Accordingly, changes in receiving voltage accompanied by the travel of the carriage 230 are similar to those of the first embodiment.

Moreover, even if the feeding voltage is applied to the transmitter coil 210 that does not contribute to the generation of the receiving voltage, it simply generates magnetic flux as load. Accordingly, it results in a current consumed, which is useless for the feed circuit 1900, flowing. Therefore, the feeding voltage is applied only to a transmitter coil 210 that is necessary to generate the receiving voltage; accordingly, the amount of power consumed can be reduced without reducing the receiving voltage of the receiver coil 200.

Figure 20C:
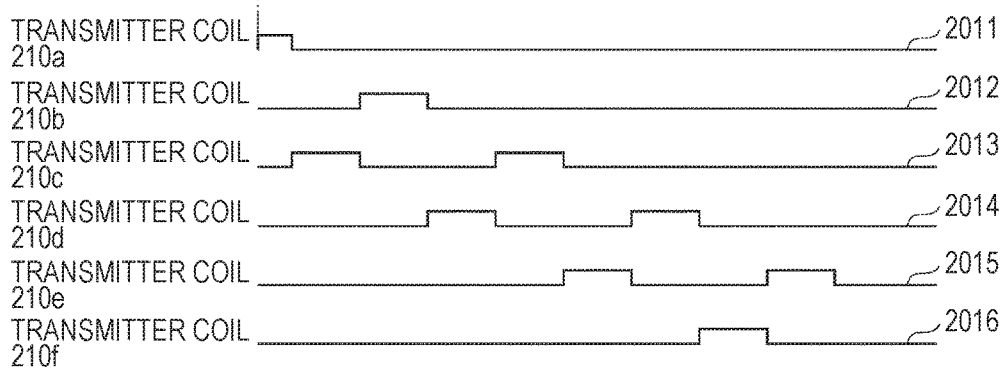
FIG. 20O is a timing chart explaining a power feed table.

FIG. 20C is a power feed table showing a relationship between the center position of the receiver coil 200a in the travel direction of the carriage 230 and the application or non-application of the feeding voltage according to the transmitter coil 210. In the power feed table, firstly, the feeding voltage is applied to the transmitter coil 210a when the receiver coil 200a faces the transmitter coil 210a. Consequently, as shown in FIG. 20B, the receiving voltage is generated in the receiver coil 200a.

Next, when the carriage 230 travels to advance the center of the receiver coil 200a a quarter or more of the center interval between the transmitter coils 210 from the center of the transmitter coil 210a, the coupling coefficient between the receiver coil 200b and the transmitter coil 210c becomes higher than the coupling coefficient between the receiver coil 200a and the transmitter coil 210a. Hence, the feeding voltage is stopped being applied to the transmitter coil 210a and also is started being applied to the transmitter coil 210c. Consequently, as shown in FIG. 20B, the receiving voltage of the receiver coil 200a drops and also the receiving voltage of the receiver coil 200b increases.

When the carriage 230 travels further to further advance the center of the receiver coil 200a a quarter or more of the center interval between the transmitter coils 210 from the center of the transmitter coil 210a, the coupling coefficient between the receiver coil 200a and the transmitter coil 210b becomes higher than the coupling coefficient between the receiver coil 200b and the transmitter coil 210c. Hence, the feeding voltage is stopped being applied to the transmitter coil 210c and also is started being applied to the transmitter coil 210b. Consequently, as shown in FIG. 20B, the receiving voltage of the receiver coil 200b drops and also the receiving voltage of the receiver coil 200a increases.

The feed circuit 1900 repeats such a switching operation as described above in step with the travel of the carriage 230. Consequently, the voltage is prevented from being applied to a transmitter coil that does not contribute to the generation of the receiving voltage; accordingly, it is possible to reduce power that is uselessly consumed.

[8] Modifications

Up to this point the present invention has been described on the basis of the embodiments. However, naturally, the present invention is not limited to the above-mentioned embodiments. The following modifications can be implemented.

(8-1) The above embodiments have been described taking, as an example, the integral unit scanning structure where the light source for illuminating a document with light and the image reading unit are mounted in the carriage 230. However, it is needless to say that the present invention is not limited to this. Instead of this, a configuration may be employed in which only the illumination light source and the mirrors are placed in the movable unit, and the image reading unit is placed in the apparatus body of the scanner. In any configuration, the present invention can be applied to obtain its effects.

(8-2) The seventh embodiment has been described, taking, as an example, the case of applying the feeding voltage such that the number of the transmitter coils 210 to which the feeding voltage is applied is always one. However, it is needless to say that the present invention is not limited to this. Instead of this, the following may be employed.

Figure 21A:
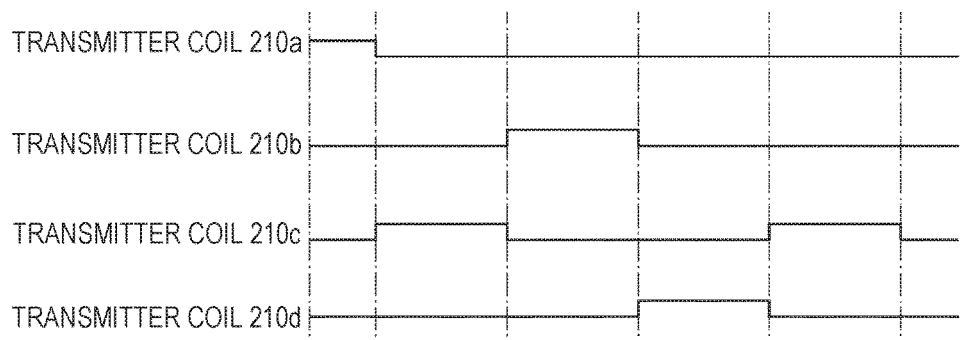
FIG. 21A illustrates a power feed table of a case without an overlapping period.
Figure 21B:
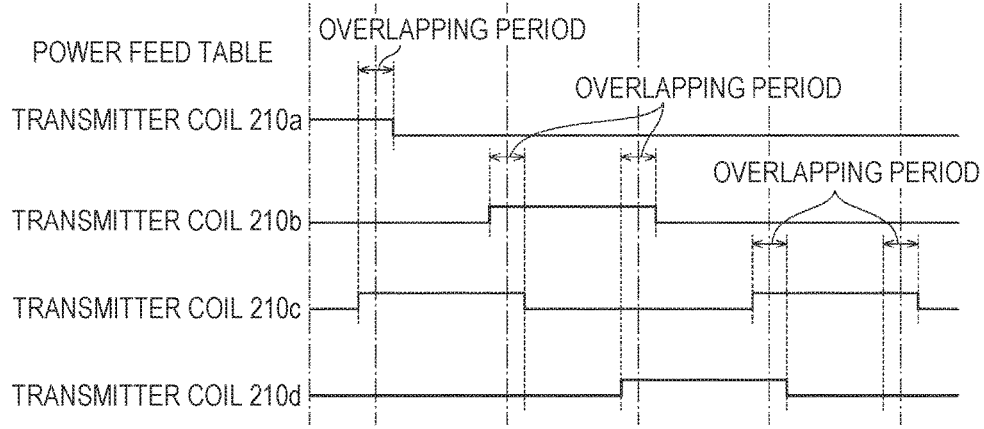
FIG. 21B illustrates a power feed table of a case with the overlapping period.

For example, the timing to start applying the feeding voltage may be advanced and the timing to stop applying the feeding voltage may be delayed as compared to the seventh embodiment to provide a period during which the feeding voltage is applied to a plurality of the transmitter coils 210 (hereinafter referred to as the "overlapping period."). FIG. 21A shows a power feed table according to the seventh embodiment, and FIG. 21B shows a power feed table of a case where the overlapping period is provided.

Differences between design values and actual values may occur in the position and characteristics of the coil due to, for example, assembling accuracy and an individual difference of a part. Accordingly, an output may not be able to be obtained as planned. Hence, a temporal error may be generated in the timings to start and stop applying the feeding voltage to the transmitter coil 210. Accordingly, there may be a timing when the receiving voltage is generated in neither the receiver coil 200a nor 200b. In contrast, as in FIG. 21B, the timing to start applying the feeding voltage is advanced, and also the timing to stop applying the feeding voltage is delayed as compared to the power feed table according to the seventh embodiment to provide the overlapping period, which ensures the generation of the receiving voltage. Accordingly, it ensures the prevention of a reduction in the quality of a scanned image of a document due to a reduction in receiving voltage.

Moreover, power may be supplied to two transmitter coils 210 that are adjacent in the sub-scanning direction. For example, a case where the transmitter coils 210a, 210b, and 210c are lined up sequentially from the upstream side is considered. When the receiver coil 200 travels from a position facing the transmitter coil 210a to a position facing the transmitter coil 210b, it is desirable to supply power to the transmitter coils 210a and 210b. Consequently, even if there arise errors in the positions to attach the transmitter coils 210a and 210b, the generation of the receiving voltage is ensured.

Similarly, when the receiver coil 200 travels from the position facing the transmitter coil 210b to the position facing the transmitter coil 210c, it is desirable to stop supplying power to the transmitter coil 210a and also to supply power to the transmitter coils 210b and 210c. Consequently, the supply of power to the transmitter coil 210a that does not contribute to the generation of die receiving voltage is stopped; accordingly, the amount of power consumed can be reduced.

(8-3) The seventh embodiment has been described, taking, as an example, the case of switching the transmitter coils 210 according to the center position of the receiver coil 200a to supply power. However, it is needless to say that the present invention is not limited to this. Instead of this, the following may be employed.

In other words, the degree of magnetic coupling may be different from its design value due to a variation in a relative position between the receiver coil 200 and the transmitter coil 210, surrounding sheet metal, a change in environment, and the like. Hence, the receiving voltage of the receiver coil 200 may be measured to correct the timings to start and stop applying the feeding voltage to the transmitter coil 210 such that the receiving voltage is equal to or greater than a predetermined threshold.

(8-3-1) The Operation of the Feed Circuit 1900

Figure 22:
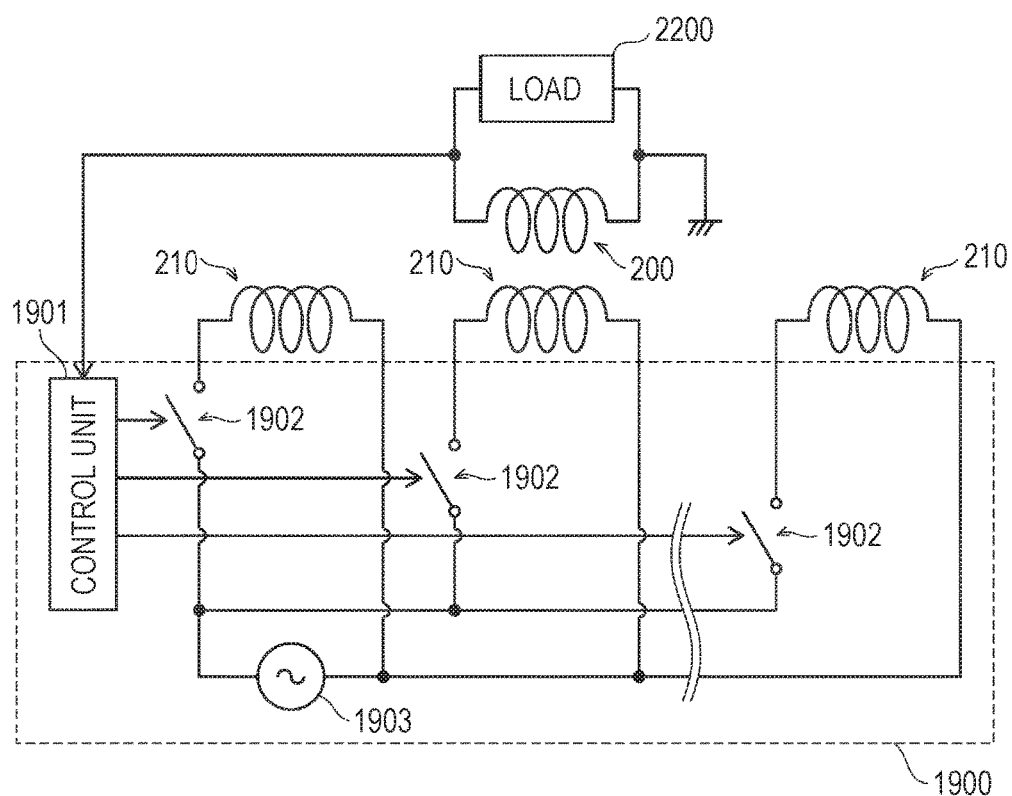
FIG. 22 is a circuit diagram showing the main configuration of the feed circuit for correcting the power feed table.

As shown in FIG. 22, in the modification, an end of the receiver coil 200 is grounded, and the other is connected to the control unit 1901 of the feed circuit 1900. Consequently, the control unit 1901 detects the receiving voltage.

FIG. 23 is a flowchart showing a process to be executed by the control unit 1901 to correct the timings to start and stop applying the feeding voltage. As shown in FIG. 23, when having accepted a scan start signal (S2301: YES), the control unit 1901 reads in the power feed table (S2302). Moreover, if there is a correction value of the power feed table (S2303: YES), the control unit 1901 also reads in the correction value (S2304). The scanning travel of the carriage 230 is started (S2305).

The control unit 1901 monitors the receiving voltage of the receiver coil 200 during the scanning travel of the carriage 230, and sequentially stores the detected receiving voltage values and travel step values of the carriage 230 (S2306) When the scanning travel of the carriage 230 is completed (S2307: YES), the carriage 230 is moved in the direction opposite to the scanning travel to return to the home position (S2308).

A facing position of each transmitter coil 210 and the receiver coil 200 is calculated from the stored receiving voltage value per travel step value (S2309). When the receiver coil 200 and the transmitter coil 210 are facing each other, the receiving voltage is at the highest. Accordingly, a travel step value representing the facing position can be identified from a maximum value of the receiving voltage value.

The calculated facing position is then compared with a value on the power feed table (S2310). If the power feed table needs to be corrected (S2311: NO), the correction value is stored (S2312). After the correction value is stored, or if YES in step S2311, the process is ended.

(8-3-2) Correction Examples

Next, correction examples are shown. The apparatus configuration of the scanner 101 is similar to that of the first embodiment.

In an example shown in FIG. 24A, planned receiving voltages (before correction) from the power feed table are different from detected values of the receiving voltage by the control unit 1901. Accordingly, positions where the receiving voltage is at its peak, that is, planned center positions, and actually measured center positions of the transmitter coils 210 are different by E1 to E10, respectively. In contrast, if the power feed table is corrected such that the receiving voltage does not fall below a correction determination threshold, the corrected receiving voltage exceeds the correction determination threshold. Therefore, a receiving voltage equal to or greater than the correction determination threshold can be supplied to the carriage 230.

Figure 24B:
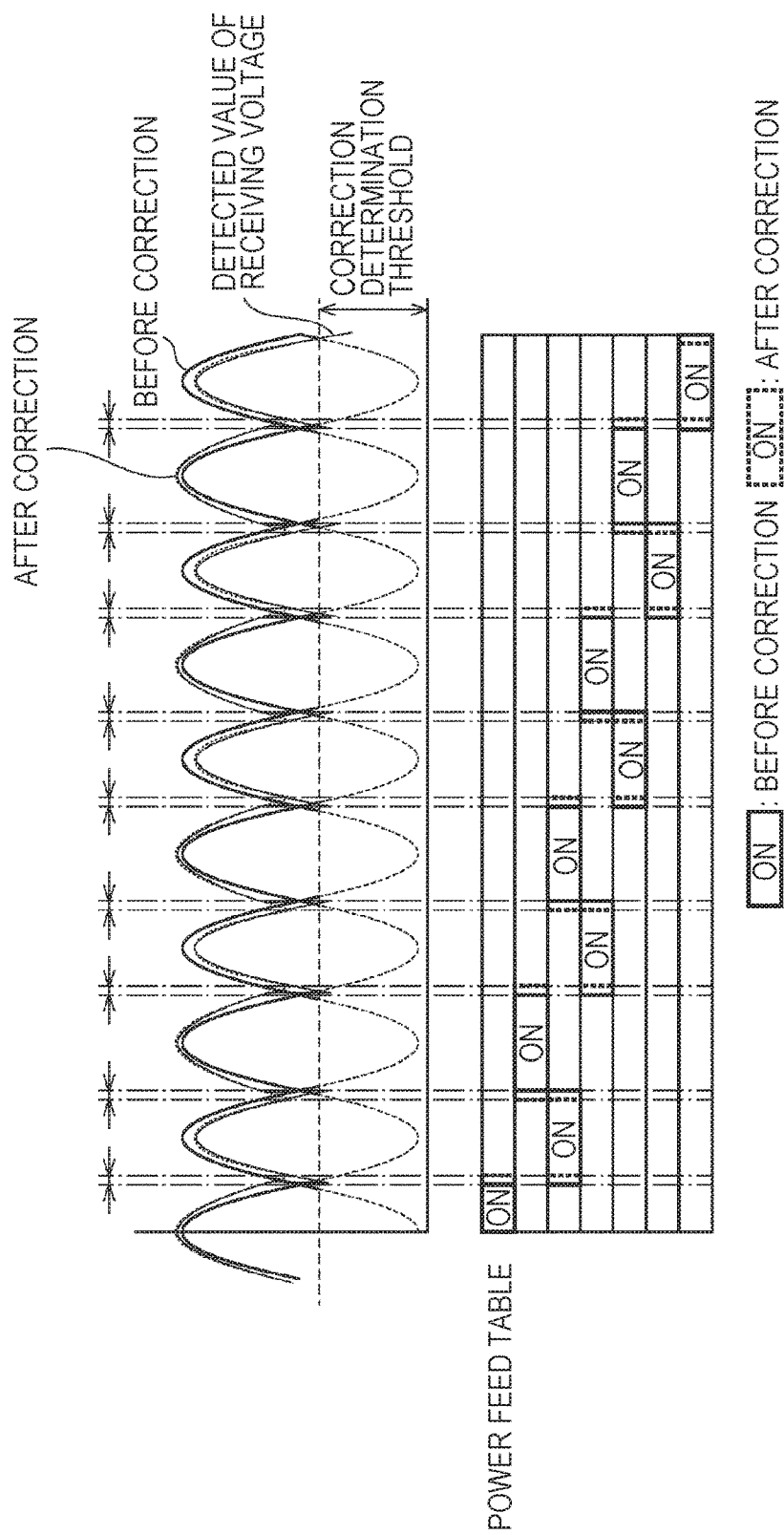

Also in an example of FIG. 24B, if the power feed table is corrected such that the detected value of the receiving voltage does not fall below the correction determination threshold, the value of the receiving voltage of the carriage 230 can be stabilized.

The control unit 1901 may detect the receiving voltage whenever reading a document to make the correction, or may detect the receiving voltage at the time of turning-on of the power or upon a pre-scanning operation before scanning when accepting a reading job for the first time to make the correction. Consequently, more efficient wireless power transfer can be performed.

Pre-scanning includes both a case of operating a reading mechanism and a case of in advance performing only an operation for acquiring the profile of the receiving voltage. The pre-scanning operation itself does not perform a reading operation, and accordingly can be finished within a short time by moving the carriage 230 at a faster speed than the scanning operation at the time of reading a document.

(8-4) The embodiments have been described, taking, as an example, the case where the image forming apparatus 1 is a tandem color multi-function peripheral. However, it is needless to say that the present invention is not limited to this. Instead of this, the present invention may be applied to a color multi-function peripheral other than one of the tandem type or a black and white multi-function peripheral. Moreover, also when the present invention is applied to image reading apparatuses such as color scanners and black and white scanners, and facsimile machines including a communication function, similar effects can be obtained.

An image reading apparatus and an image forming apparatus according to the present invention are useful as apparatuses that stabilize wireless power transfer to a carriage.

According to an embodiment of the present invention, a power storage mechanism such as a secondary battery becomes unnecessary. Accordingly, the weight of the movable body is prevented from increasing. The cost increase due to an increase in the number of transmitter coils is prevented. Moreover, wireless power supply to a light source provided in the movable body can be stabilized.

In this case, it may be configured such that the plurality of receiver coils is lined up along a travel direction of the movable body. Moreover, it is more suitable if the plurality of transmitter coils is lined up at regular intervals P such that center positions of the transmitter coils are along the travel direction of the movable body, and the plurality of receiver coils is lined up such that an interval between center positions of the receiver coils is $P \times (N+1)/N$ or $P \times (N-1)/N$ where N is the number of the receiver coils.

Moreover, it may be configured such that the plurality of receiver coils is placed such that the tracks thereof following the travel of the movable body do riot overlap with each other, the plurality of transmitter coils forms a plurality of transmitter coil rows in a state of lying along the tracks of the plurality of receiver coils, each of the plurality of transmitter coil rows includes the transmitter coils lined up at regular intervals, and the interval is the same in any transmitter coil row.

In this case, it may be further configured such that the plurality of receiver coils is lined up in a state of being arranged in a line in a direction orthogonal to a direction of the travel, and the N-th transmitter coils from the beginning of the plurality of transmitter coil rows are not arranged in the direction orthogonal to the travel direction, and are placed at positions displaced from each other in the travel direction.

Moreover, it may be configured such that the N-th transmitter coils from the beginning of the plurality of transmitter coil rows are placed in a state of being arranged in a line in a direction orthogonal to a direction of the travel, and the plurality of receiver coils is not arranged in a line in the direction orthogonal to the travel direction, and is placed at positions displaced from each other in the travel direction.

Moreover, it may be configured, including a first oscillation unit configured to oscillate the receiver coil about a rock shaft orthogonal to the travel direction in plan view and orthogonal to a coil axis of the receiver coil, and a second oscillation unit configured to oscillate the transmitter coil about a rock shaft orthogonal to the travel direction in plan view and orthogonal to a coil axis of the transmitter coil, such that the first oscillation unit oscillates the receiver coil such that the coil axis of the receiver coil is oriented toward the transmitter coil closest in the travel direction to the receiver coil as the movable body travels, and the second oscillation unit oscillates the transmitter coil such that the coil axis of the transmitter coil closest in the travel direction: to the receiver coil is oriented toward the receiver coil as the movable body travels.

Moreover, it may be configured, including a reciprocating unit configured to reciprocate the receiver coil in a direction of the travel with respect to the movable body as the movable body travels, such that the reciprocating unit causes the receiver coil to travel in the travel direction with respect to the movable body after a coil axis of the receiver coil passes a midpoint between the transmitter coils adjacent in the travel direction, and causes the receiver coil to travel in a direction opposite to the travel direction with respect to the movable body after the coil axis of the receiver coil passes a coil axis of the transmitter coil closest in the travel direction to the receiver coil.

Moreover, it may be configured, including a reciprocating unit configured to reciprocate the transmitter coil in a direction of the travel as the movable body travels, such that the reciprocating unit causes the transmitter coil to travel in a direction opposite to a direction of the travel after a coil axis of the receiver coil passes a midpoint between the transmitter coils adjacent in the travel direction, and causes the transmitter coil to travel in the travel direction of the movable body after the coil axis of the receiver coil passes a coil axis of the transmitter coil closest in the travel direction to the receiver coil.

Moreover, it may be configured including an interval adjustment unit configured to adjust an interval between the transmitter coils in a direction of the travel in proportion to a size in the travel direction of a document to be read.

Moreover, it may be configured, including a position detection unit configured to detect a position of each of the plurality of receiver coils in a direction of the travel, and a power supply control unit configured to control feeding voltages according to the plurality of transmitter coils, such that the power supply control unit applies a feeding voltage only to the transmitter coil whose coupling coefficient is increased to highest for each of the plurality of receiver coils during the travel of the movable body.

In this case, it is more suitable if a voltage detection unit configured to detect receiving voltages according to the plurality of receiver coils during the travel of the movable body is included, and the power supply control unit controls the feeding voltage according to the receiving voltage detected by the voltage detection unit upon pre-scanning or previous document reading.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image reading apparatus comprising:
   a movable body configured to illuminate a document with light while traveling; and
   an apparatus body configured to wirelessly transmit power to the movable body, wherein
   the movable body includes
      a plurality of receiver coils, and
      a feed circuit in which the plurality of receiver coils uses receiving power to supply power to a load in the movable body,
   the apparatus body includes a plurality of transmitter coils placed along a track of the receiver coils following the travel of the movable body,
   the transmitter coils and the receiver coils are placed such that power supply efficiency of any receiver coil with the transmitter coil placed along the track of the receiver coil fluctuates as the movable body travels, and power supply efficiency related to one receiver coil increases at a position where power supply efficiency related to the other receiver coil drops during the travel of the movable body, and
   the feed circuit supplies power sequentially using the receiving power of the receiver coil whose power supply efficiency is increased to highest among the plurality of receiver coils during the travel of the movable body.

2. The image reading apparatus according to claim 1, wherein the plurality of receiver coils is lined up along a travel direction of the movable body.

3. The image reading apparatus according to claim 2, wherein
   the plurality of transmitter coils is lined up at regular intervals P such that center positions of the transmitter coils are along the travel direction of the movable body, and
   the plurality of receiver coils is lined up such that an interval between center positions of the receiver coils is P×(N+1)/N or P×(N−1)/N where N is the number of the receiver coils.

4. The image reading apparatus according to claim 1, wherein
   the plurality of receiver coils is placed such that the tracks thereof following the travel of the movable body do not overlap with each other,
   the plurality of transmitter coils forms a plurality of transmitter coil rows in a state of lying along the tracks of the plurality of receiver coils,
   each of the plurality of transmitter coil rows includes the transmitter coils lined up at regular intervals, and
   the interval is the same in any transmitter coil row.

5. The image reading apparatus according to claim 4, wherein
   the plurality of receiver coils is lined up in a state of being arranged in a line in a direction orthogonal to a direction of the travel, and
   the N-th transmitter coils from the beginning of the plurality of transmitter coil rows are not arranged in the direction orthogonal to the travel direction, and are placed at positions displaced from each other in the travel direction.

6. The image reading apparatus according to claim 4, wherein
the N-th transmitter coils from the beginning of the plurality of transmitter coil rows are placed in a state of being arranged in a line in a direction orthogonal to a direction of the travel, and
the plurality of receiver coils is not arranged in a line in the direction orthogonal to the travel direction, and is placed at positions displaced from each other the travel direction.

7. The image reading apparatus according to claim 1, further comprising:
a first oscillation unit configured to oscillate the receiver coil about a rock shaft orthogonal to a direction of the travel in plan view and orthogonal to a coil axis of the receiver coil; and
a second oscillation unit configured to oscillate the transmitter coil about a rock shaft orthogonal to the travel direction in plan view and orthogonal to a coil axis of the transmitter coil, wherein
the first oscillation unit oscillates the receiver coil such that the coil axis of the receiver coil is oriented toward the transmitter coil closest in the travel direction to the receiver coil as the movable body travels, and
the second oscillation unit oscillates the transmitter coil such that the coil axis of the transmitter coil closest in the travel direction to the receiver coil is oriented toward the receiver coil as the movable body travels.

8. The image reading apparatus according to claim 1, further comprising
a reciprocating unit configured to reciprocate the receiver coil in a direction of the travel with respect to the movable body as the movable body travels, wherein
the reciprocating unit
causes the receiver coil to travel in the travel direction with respect to the movable body after a coil axis of the receiver coil passes a midpoint between the transmitter coils adjacent in the travel direction, and
causes the receiver coil to travel in a direction opposite to the travel direction with respect to the movable body after the coil axis of the receiver coil passes a coil axis of the transmitter coil closest in the travel direction to the receiver coil.

9. The image reading apparatus according to claim 1, further comprising
a reciprocating unit configured to reciprocate the transmitter coil in a direction of the travel as the movable body travels, wherein
the reciprocating unit
causes the transmitter coil to travel in a direction opposite to a direction of the travel after a coil axis of the receiver coil passes a midpoint between the transmitter coils adjacent in the travel direction, and
causes the transmitter coil to travel in the travel direction of the movable body after the coil axis of the receiver coil passes a coil axis of the transmitter coil closest in the travel direction to the receiver coil.

10. The image reading apparatus according to claim 1, further comprising
an interval adjustment unit configured to adjust an interval between the transmitter coils in a direction of the travel in proportion to a size in the travel direction of a document to be read.

11. The image reading apparatus according to claim 1, further comprising:
a position detection unit configured to detect a position of each of the plurality of receiver coils in a direction of the travel; and
a power supply control unit configured to control feeding voltages according to the plurality of transmitter coils, wherein
the power supply control unit applies a feeding voltage only to the transmitter coil whose coupling coefficient is increased to highest for each of the plurality of receiver coils during the travel of the movable body.

12. The image reading apparatus according to claim 11, further comprising
a voltage detection unit configured to detect receiving voltages according to the plurality of receiver coils during the travel of the movable body, wherein
the power supply control unit controls the feeding voltage according to the receiving voltage detected by the voltage detection unit upon pre-scanning or previous document reading.

* * * * *